United States Patent
Kim et al.

(10) Patent No.: US 11,677,526 B2
(45) Date of Patent: *Jun. 13, 2023

(54) METHOD AND APPARATUS FOR TRANSMITTING AND RECEIVING REFERENCE SIGNAL IN WIRELESS COMMUNICATION SYSTEM

(71) Applicant: LG ELECTRONICS INC., Seoul (KR)

(72) Inventors: Kyuseok Kim, Seoul (KR); Jiwon Kang, Seoul (KR); Kijun Kim, Seoul (KR); Hyungtae Kim, Seoul (KR); Minki Ahn, Seoul (KR); Sukhyon Yoon, Seoul (KR); Kilbom Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 93 days.

This patent is subject to a terminal disclaimer.

(21) Appl. No.: 17/343,247

(22) Filed: Jun. 9, 2021

(65) Prior Publication Data

US 2021/0297220 A1    Sep. 23, 2021

Related U.S. Application Data

(63) Continuation of application No. 16/499,740, filed as application No. PCT/KR2018/003775 on Mar. 30, 2018, now Pat. No. 11,057,177.

(Continued)

(51) Int. Cl.
*H04L 5/00*    (2006.01)

(52) U.S. Cl.
CPC .......... *H04L 5/0048* (2013.01); *H04L 5/0007* (2013.01)

(58) Field of Classification Search
CPC ............................ H04L 5/0048; H04L 5/0007
(Continued)

(56) References Cited

U.S. PATENT DOCUMENTS

| 10,419,087 B2 * | 9/2019 | Kim ..................... H04B 7/0456 |
| 2013/0044692 A1 | 2/2013 | Nory et al. |

(Continued)

FOREIGN PATENT DOCUMENTS

| CN | 106452710 | 2/2017 |
| JP | 2013517642 | 5/2013 |

(Continued)

OTHER PUBLICATIONS

Huawei & HiSilicon, "Evaluation results of DMRS design for DL data channel," Rl-1701693, 3GPP TSG RAN WG1 Meeting #88, Athens, Greece, Feb. 13-17, 2017, 14 pages.

(Continued)

*Primary Examiner* — Christopher R Crompton
(74) *Attorney, Agent, or Firm* — Fish & Richardson P.C.

(57) ABSTRACT

Disclosed herein are a method and apparatus for performing, by UE, decoding in a wireless communication system. According to the present invention, there may be a method and an apparatus for decoding data in which a demodulation reference signal (DMRS) configured by a base station according to a specific pattern is received from the base station through a DMRS symbol, the demodulation reference signal is transmitted on a specific antenna port and located on the same one or two time-axis symbols as at least one other demodulation reference signal transmitted on another antenna port, the specific pattern is determined according to characteristics of a frequency band in which the demodulation reference signal is transmitted, the demodulation reference signal is mapped to the one or two time-axis symbols using at least one of a first code division multi- (Continued)

plexing (CDM) on a frequency axis or a second CDM on a time axis, and the data are decoded using the demodulation reference signal.

20 Claims, 16 Drawing Sheets

Related U.S. Application Data

(60) Provisional application No. 62/505,139, filed on May 12, 2017, provisional application No. 62/479,390, filed on Mar. 31, 2017.

(58) Field of Classification Search
USPC .......................................................... 370/329
See application file for complete search history.

(56) References Cited

U.S. PATENT DOCUMENTS

| 2013/0070732 | A1* | 3/2013 | Noh .................. | H04J 13/18 |
|---|---|---|---|---|
| | | | | 370/335 |
| 2017/0078006 | A1 | 3/2017 | Liu et al. | |
| 2018/0206224 | A1 | 7/2018 | Hwang et al. | |
| 2019/0349240 | A1 | 11/2019 | Saito et al. | |
| 2019/0349960 | A1 | 11/2019 | Li et al. | |
| 2020/0328768 | A1 | 10/2020 | Hessler et al. | |

FOREIGN PATENT DOCUMENTS

| JP | 2013520130 | | 5/2013 | |
|---|---|---|---|---|
| JP | 2013524580 | | 6/2013 | |
| JP | 2016219895 | | 12/2016 | |
| WO | WO15148041 | | 10/2015 | |
| WO | WO15148045 | | 10/2015 | |
| WO | WO16093600 | | 6/2016 | |
| WO | WO2016127309 | | 8/2016 | |
| WO | WO 2017/138880 | * | 2/2017 | ............... H04L 5/00 |

OTHER PUBLICATIONS

Office Action in Chinese Appln. No. 201880035259.6, dated Sep. 15, 2021, 16 pages (with English translation).
Notice of Allowance in Korean Appln. No. 10-2019-7029167, dated Nov. 3, 2021, 4 pages (with English translation).
NTT Docomo, Inc., "Views on DMRS," R1-1700606, Presented at 3GPP TSG RAN WG1 NR Ad-Hoc Meeting, Spokane, USA Jan. 16-20, 2017, 8 pages.
Vivo, "Data and control channel DMRS design," R1-1704491, Presented at 3GPP TSG RAN WG1 Meeting #88bis, Spokane, Washington, USA Apr. 3-7, 2017, 5 pages.
Ericsson, "Evaluation Results for UL DMRS," R1-1705905, 3GPP TSG-RAN WG1 #88bis, Spokane, WA, USA, Apr. 3-7, 2017, 9 pages.
European Extended Search Report in European Appln. No. 18776854.4, dated Nov. 20, 2020, 9 pages.
Huawei, HiSilicon, "Design of DL DMRS for data transmission," R1-1704233,3GPP TSG RAN WG1 Meeting #88bis, Spokane, USA, Apr. 3-7, 2017, 6 pages.
ITL, "Considerations on DMRS pattern design for NR," R1-1705794, 3GPP TSG RAN WG1 Meeting #88-bis, Spokane, USA, Apr. 3-7, 2017, 4 pages.
JP Office Action in Japanese Appln. No. 2019-553821, dated Jan. 5, 2021, 11 pages (with English translation).
KR Office Action in Korean Appln. No. 10-2019-7029167, dated Dec. 10, 2020, 13 pages.
LG Electronics, "Discussion on Phase Tracking RS for DL," R1-1702463, 3GPP TSG RAN WG1 Meeting #88, Athens, Greece, Feb. 13-17, 2017, 5 pages.
LG Electronics, "Summary of [87-28] email discussion on DMRS design for DL data channel," R1-1700479, 3GPP TSG RAN WG1 NR Ad-Hoc Meeting, Spokane, USA, dated Jan. 16-20, 2017, 15 pages.
MediaTek Inc., "On the downlink demodulation reference signal design for the normal CP," R1-1612146, 3GPP TSG-RAN WG1 Meeting #87, Reno, Nevada, United States, dated Nov. 14-Nov. 18, 2016, 8 pages.
Nokia et al., "DL DMRS Patterns Link Performance Evaluation," R1-1703181, 3GPP TSG RAN WG1 #88, Athens, Greece, dated Feb. 13-17, 2017, 22 pages.
Pantech, "Aperiodic sounding in Rel-11," RI-113110, 3GPP TSG RAN1 #66bis, Zhuhai, China, dated Oct. 10-14, 2011, 3 pages.
PCT International Search Report in International Appln. No. PCT/KR2018/003775, dated Jul. 16, 2018, 7 pages.
ZTE, ZTE Microelectronics, "Discussion on downlink DMRS design," R1-1700135, 3GPP TSG RAN WG1 NR Ad-Hoc Meeting, Spokane, USA, Jan. 16-20, 2017, 10 pages.
ZTE, ZTE Microelectronics, "Discussion on RS for phase tracking," R1-1701817, 3GPP TSG RAN WG1 Meeting #88, Athens, Greece, dated Feb. 13-17, 2017, 9 pages.

* cited by examiner

METHOD AND APPARATUS FOR TRANSMITTING AND RECEIVING REFERENCE SIGNAL IN WIRELESS COMMUNICATION SYSTEM

TECHNICAL FIELD

The present invention relates to a wireless communication system, and more particularly, to a method and an apparatus for generating and transmitting and receiving a demodulation reference signal (DMRS) for decoding data in a wireless communication system.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An embodiment of the present invention provides a method and apparatus for generating and transmitting and receiving a demodulation reference signal (DMRS) for decoding data.

Furthermore, an embodiment of the present invention provides a method and apparatus for generating and transmitting and receiving a DMRS for estimating common phase error (CPE)/carrier frequency offset (CFO) values due to a Doppler effect.

Furthermore, an embodiment of the present invention provides a mapping pattern of a demodulation reference signal in consideration of a trade-off between overhead due to transmission of a reference signal and channel estimation performance.

Furthermore, an embodiment of the present invention provides a multiplexing method for extending the number of ports for transmitting a demodulation reference signal.

Furthermore, an embodiment of the present invention provides a method for mapping a reference signal using a code division multiplexing scheme on a frequency axis and a time axis.

Furthermore, an embodiment of the present invention provides a multiplexing and repeating method for extending the number of ports for transmitting a demodulation reference signal.

Objects of the present invention are not limited to the above-mentioned objects. That is, other objects that are not mentioned may be obviously understood by those skilled in the art to which the present invention pertains from the following description.

Technical Solution

Furthermore, in this specification, a method for performing, user equipment (UE), to decode data in a wireless communication system, includes: receiving a demodulation reference signal (DMRS) configured by a base station according to a specific pattern from the base station through a DMRS symbol, the demodulation reference signal being transmitted on a specific antenna port and located on the same one or two time-axis symbols as at least one other demodulation reference signal transmitted on another antenna port, the demodulation reference signal being mapped to the one or two time-axis symbols using at least one of a first code division multiplexing (CDM) on a frequency axis or a second CDM on a time axis, and the specific pattern being determined according to characteristics of a frequency band in which the demodulation reference signal is transmitted; and decoding the data using the demodulation reference signal.

The demodulation reference signal is located on the one or two time axis symbols based on at least one of the number of transport layers, a port index, a rank, or the maximum number of transport ports.

When the demodulation reference signal is located on one time-axis symbol, the demodulation reference signal is mapped using the first CDM.

When the demodulation reference signal is located on two time-axis symbols, the demodulation reference signal is mapped using the second CDM.

The method further includes: receiving a signal indicating whether to apply the second CDM from the base station, in which the demodulation reference signal is mapped using the first CDM and the second CDM, when the signal indicates that the second CDM is applied.

The method further includes: receiving a signal indicating a length of the first CDM from the base station when the first CDM is applied, in which it is determined whether to apply the second CDM depending on the length of the first CDM.

When the demodulation reference signal is mapped using the first CDM and the second CDM, a type of orthogonal cover codes (OCCs) applied to the second CDM is limited to at least one type by the base station.

The method further includes: receiving the signal indicating the at least one type from the base station.

Furthermore, in this specification, user equipment (UE) decoding data in a wireless communication system includes: a radio frequency unit configured to transmit and receive a radio signal to and from the outside; and a processor configured to functionally coupled to the radio frequency unit, in which the processor receives a demodulation reference signal (DMRS) configured by a base station according to a specific pattern from the base station through a DMRS symbol, the demodulation reference signal being transmitted on a specific antenna port and located on the same one or two time-axis symbols as at least one other demodulation reference signal transmitted on another antenna port, the demodulation reference signal being mapped to the one or two time-axis symbols using at least one of a first code division multiplexing (CDM) on a frequency axis or a second CDM on a time axis, and the specific pattern being determined according to characteristics of a frequency band in which the demodulation reference signal is transmitted, and decodes the data using the demodulation reference signal.

Advantageous Effects

According to the present invention, it is possible to decode data by estimating the common phase error (CPE) and carrier frequency offset (CFO) values due to the Doppler effect through the DMRS.

In addition, according to the present invention, it is possible to estimating the channel through additional DMRS in the high Doppler environment.

In addition, according to the present invention, it is possible to change the pattern of the DMRS according to the situation of the UE by mapping the demodulation reference signal in consideration of the trade-off between the overhead due to the transmission of the reference signal and the channel estimation performance.

In addition, according to the present invention, it is possible to extend the number of ports for transmitting the demodulation reference signal by using the code division multiplexing scheme on the time axis as well as the frequency axis.

In addition, according to the present invention, it is possible to extend the number of ports for transmitting the demodulation reference signal by mapping the reference signal using the multiplexing and repetition.

Effects which can be achieved by the present invention are not limited to the above-mentioned effects. That is, other objects that are not mentioned may be obviously understood by those skilled in the art to which the present invention pertains from the following description.

DESCRIPTION OF DRAWINGS

The accompanying drawings, which are included as part of the detailed description to assist understanding of the invention, illustrate embodiments of the invention and explain the technical features of the invention together with the detailed description.

MODE FOR INVENTION

Figure 1A:
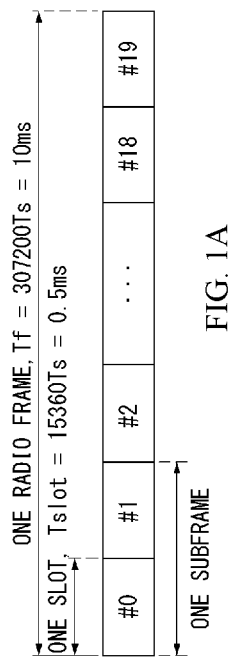
FIGS. 1A and 1B are diagrams illustrating a structure of a radio frame in a wireless communication system to which the present invention can be applied.

Some embodiments of the present invention are described in detail with reference to the accompanying drawings. A detailed description to be disclosed along with the accompanying drawings are intended to describe some embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to which the Present Invention May be Applied

Figure 1B:
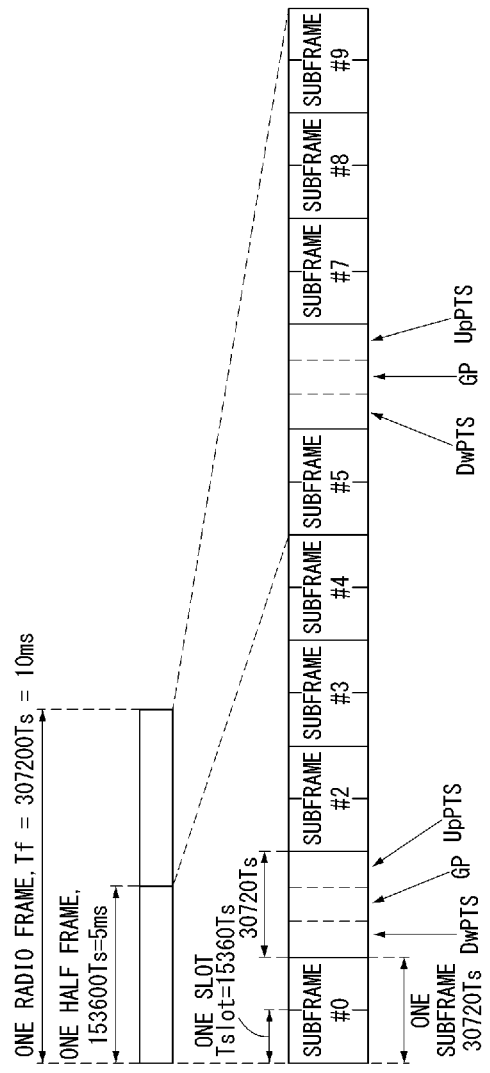

FIGS. 1A and 1B show the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of T_s=1/(15000*2048). A UL and DL transmission includes the radio frame having a duration of T_f=307200*T_s=10 ms.

FIG. 1A exemplifies a radio frame structure type 1. The type 1 radio frame may be applied to both of full duplex FDD and half duplex FDD.

A radio frame includes 10 subframes. A radio frame includes 20 slots of T_slot=15360*T_s=0.5 ms length, and 0 to 19 indexes are given to each of the slots. One subframe includes consecutive two slots in the time domain, and subframe i includes slot 2*i* and slot 2*i*+1. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1B shows frame structure type 2.

A type 2 radio frame includes two half frame of 153600*T_s=5 ms length each. Each half frame includes 5 subframes of 30720*T_s=1 ms length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for a DL transmission, 'U' represents a subframe for UL transmission, and 'S' represents a special subframe including three types of fields including a Downlink Pilot Time Slot (DwPTS), a Guard Period (GP), and a Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot 2*i* and slot 2*i*+1 of T_slot=15360*T_s=0.5 ms.

The UL-DL configuration may be classified into 7 types, and the position and/or the number of a DL subframe, a special subframe and a UL subframe are different for each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half-frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 represents configuration (length of DwPTS/GP/UpPTS) of a special subframe.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | | |
| 5 | $6592 \cdot T_s$ | $4384 \cdot T_s$ | $5120 \cdot T_s$ | $20480 \cdot T_s$ | $4384 \cdot T_s$ | $5120 \cdot T_s$ |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of a radio subframe according to the example of FIGS. 1A and 1B is just an example, and the number of subcarriers included in a radio frame, the number of slots included in a subframe and the number of OFDM symbols included in a slot may be changed in various manners.

Figure 2:
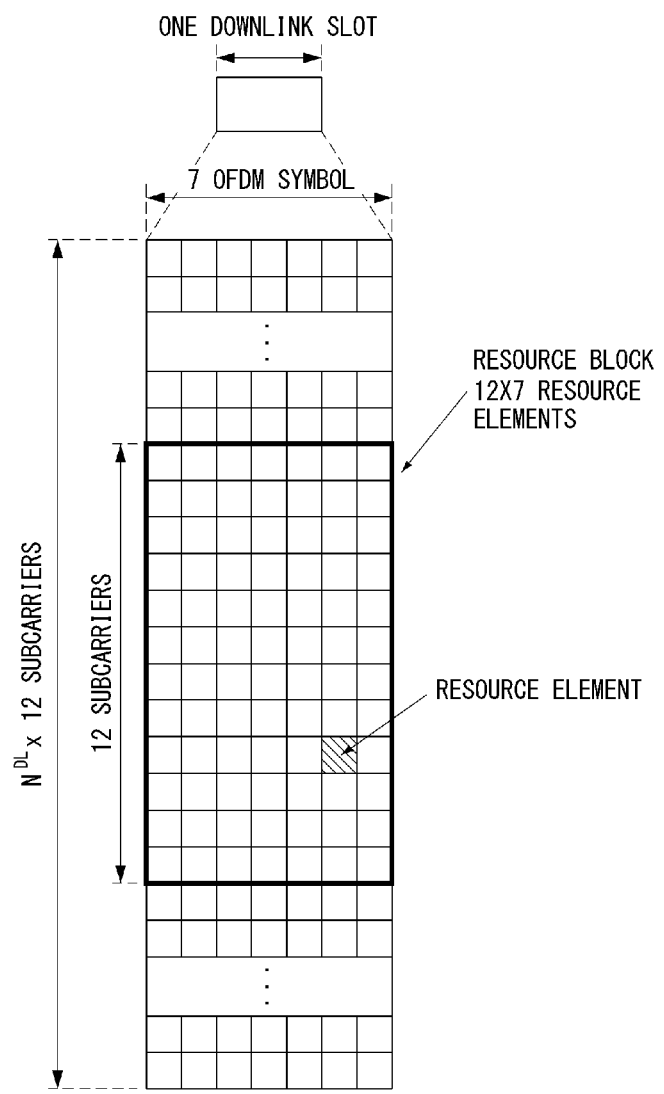
FIG. 2 is a diagram illustrating a resource grid for one downlink slot in a wireless communication system to which the present invention can be applied.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs N^DL included in a downlink slot depends on a downlink transmission bandwidth.

The structure of an uplink slot may be the same as that of a downlink slot.

Figure 3:
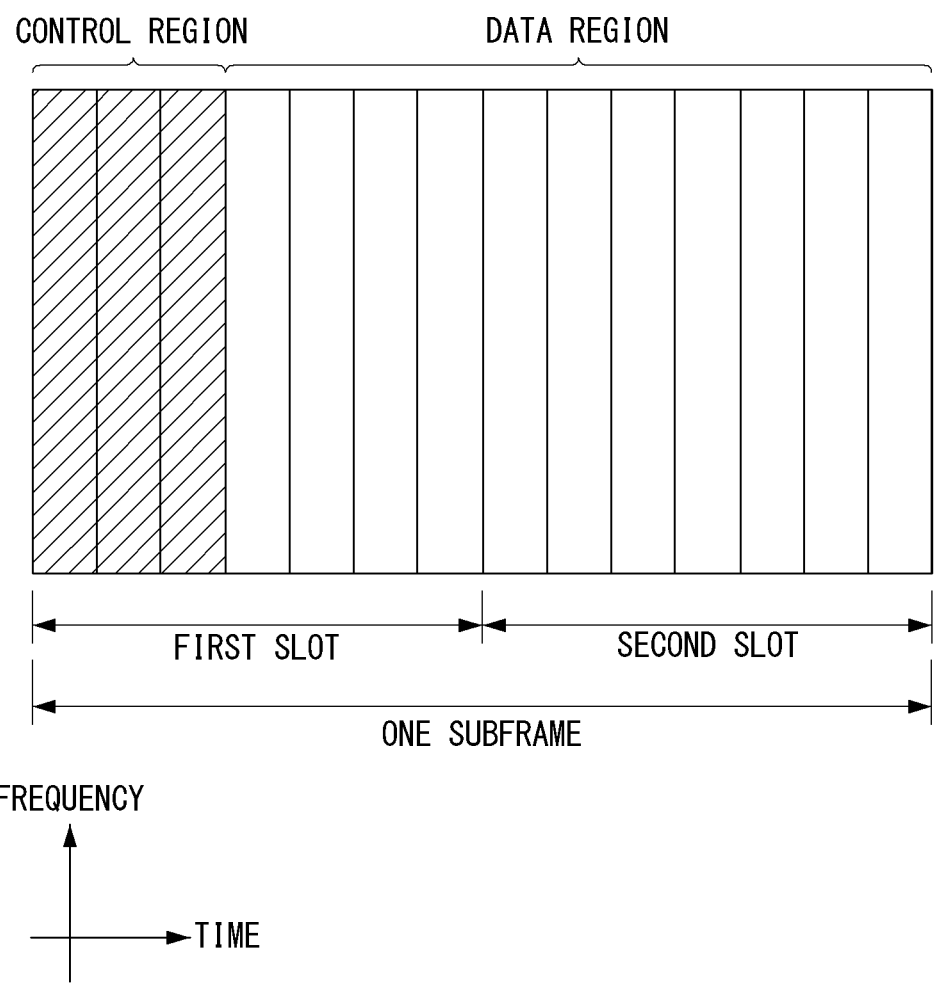
FIG. 3 is a diagram illustrating a structure of a downlink subframe in a wireless communication system to which the present invention can be applied.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARD). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (this is called a Radio Network Temporary Identifier (RNTI)) is masked to the CRC depending on the owner or use of a PDCCH. In the case that the PDCCH is a PDCCH for specific UE, an identifier unique to the UE, for example, a Cell-RNTI (C-RNTI) may be masked to the CRC. Or, in the case that the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

Figure 4:
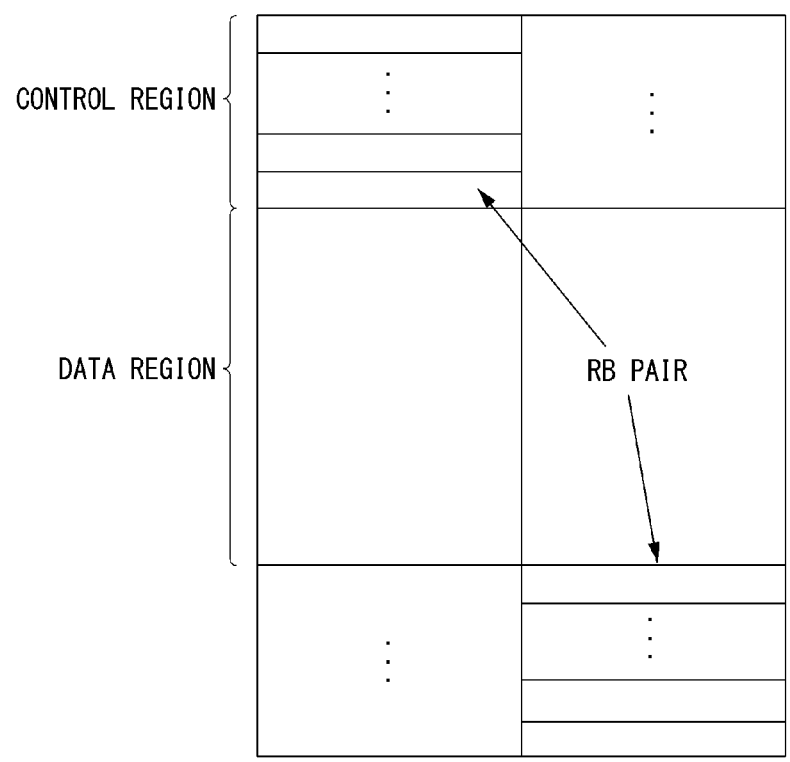
FIG. 4 is a diagram illustrating a structure of an uplink subframe in a wireless communication system to which the present invention can be applied.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Reference Signal (RS)

In a wireless communication system, a signal may be distorted during transmission because data is transmitted through a radio channel. In order for a terminal to accurately receive a distorted signal, the distortion of a received signal needs to be corrected using channel information. In order to detect channel information, a method of detecting channel information using the degree of the distortion of a signal transmission method and a signal known to both the transmission side and the reception side when they are transmitted through a channel is chiefly used. The aforementioned signal is called a pilot signal or reference signal (RS).

Furthermore recently, when most of mobile communication systems transmit a packet, they use a method capable of improving transmission/reception data efficiency by adopting multiple transmission antennas and multiple reception antennas instead of using one transmission antenna and one reception antenna used so far. When data is transmitted and received using multiple input/output antennas, a channel state between the transmission antenna and the reception antenna must be detected in order to accurately receive the signal. Accordingly, each transmission antenna must have an individual reference signal.

In a mobile communication system, an RS may be basically divided into two types depending on its object. There are an RS having an object of obtaining channel state information and an RS used for data demodulation. The former has an object of obtaining, by a UE, to obtain channel state information in the downlink. Accordingly, a corresponding RS must be transmitted in a wideband, and a UE must be capable of receiving and measuring the RS although the UE does not receive downlink data in a specific subframe. Furthermore, the former is also used for radio resources management (RRM) measurement, such as handover. The latter is an RS transmitted along with corresponding resources when an eNB transmits the downlink. A UE may perform channel estimation by receiving a corresponding RS and thus may demodulate data. The corresponding RS must be transmitted in a region in which data is transmitted.

A downlink RS includes one common RS (CRS) for the acquisition of information about a channel state shared by all of UEs within a cell and measurement, such as handover, and a dedicated RS (DRS) used for data demodulation for only a specific UE. Information for demodulation and channel measurement can be provided using such RSs. That is, the DRS is used for only data demodulation, and the CRS is used for the two objects of channel information acquisition and data demodulation.

The reception side (i.e., UE) measures a channel state based on a CRS and feeds an indicator related to channel quality, such as a channel quality indicator (CQI), a precoding matrix index (PMI) and/or a rank indicator (RI), back to the transmission side (i.e., an eNB). The CRS is also called a cell-specific RS. In contrast, a reference signal related to the feedback of channel state information (CSI) may be defined as a CSI-RS.

The DRS may be transmitted through resource elements if data on a PDSCH needs to be demodulated. A UE may receive information about whether a DRS is present through a higher layer, and the DRS is valid only if a corresponding PDSCH has been mapped. The DRS may also be called a UE-specific RS or demodulation RS (DMRS).

Figure 5A:
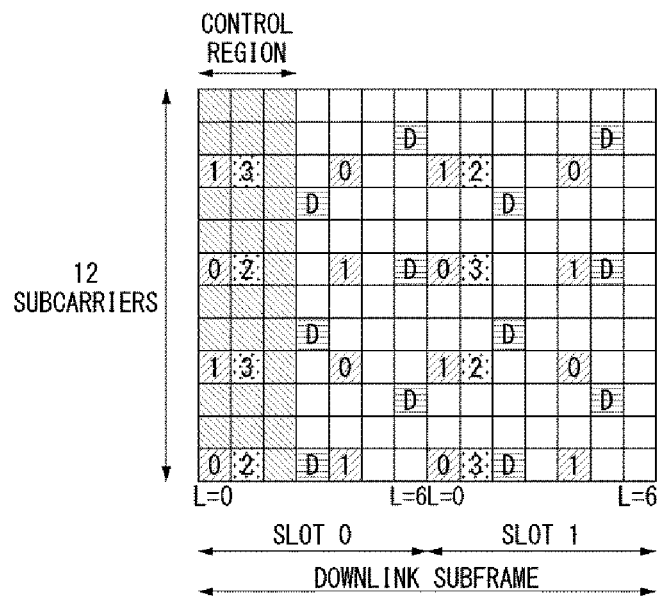
FIGS. 5A and 5B are diagrams illustrating a reference signal pattern mapped to a downlink resource block pair in a wireless communication system to which the present invention can be applied.
Figure 5B:
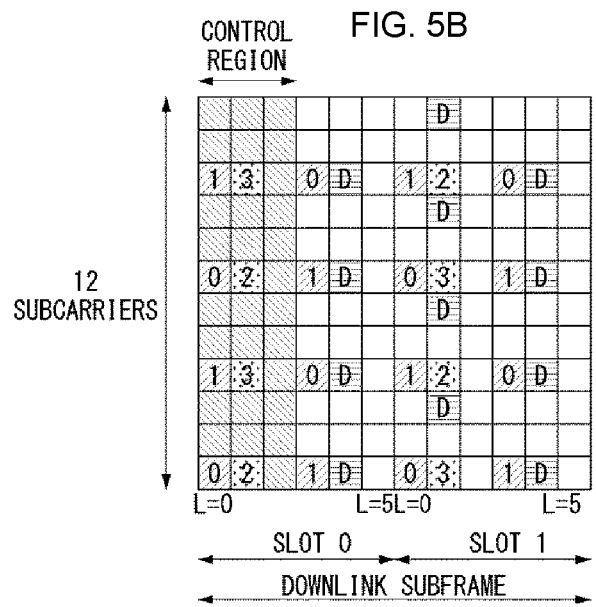

FIGS. 5A and 5B illustrate reference signal patterns mapped to downlink resource block pairs in a wireless communication system to which the present invention may be applied.

Referring to FIGS. 5A and 5B, a downlink resource block pair, that is, a unit in which a reference signal is mapped, may be represented in the form of one subframe in a time domain X 12 subcarriers in a frequency domain. That is, in a time axis (an x axis), one resource block pair has a length of 14 OFDM symbols in the case of a normal cyclic prefix (CP) (FIG. 5A) and has a length of 12 OFDM symbols in the case of an extended cyclic prefix (CP) (FIG. 5B). In the resource block lattice, resource elements (REs) indicated by "0", "1", "2", and "3" mean the locations of the CRSs of antenna port indices "0", "1", "2", and "3", respectively, and REs indicated by "D" mean the location of a DRS.

A CRS is described in more detail below. The CRS is a reference signal which is used to estimate the channel of a physical antenna and may be received by all UEs located within a cell in common. The CRS is distributed to a full frequency bandwidth. That is, the CRS is cell-specific signal and is transmitted every subframe in a wideband. Furthermore, the CRS may be used for channel quality information (CSI) and data demodulation.

A CRS is defined in various formats depending on an antenna array on the transmitting side (eNB). In the 3GPP LTE system (e.g., Release-8), an RS for a maximum four antenna ports is transmitted depending on the number of transmission antennas of an eNB. The side from which a downlink signal is transmitted has three types of antenna arrays, such as a single transmission antenna, two transmission antennas and four transmission antennas. For example, in the case that the number of transmission antennas of an eNB is two, CRSs for a No. 0 antenna port and a No. 1 antenna port are transmitted. In the case that the number of transmission antennas of an eNB is four, CRSs for No. 0 to No. 3 antenna ports are transmitted.

In the case that an eNB uses a single transmission antenna, reference signals for a single antenna port are arrayed.

In the case that an eNB uses two transmission antennas, reference signals for two transmission antenna ports are arrayed using a time division multiplexing (TDM) scheme and/or a frequency division multiplexing (FDM) scheme. That is, different time resources and/or different frequency resources are allocated in order to distinguish between reference signals for two antenna ports.

Furthermore, in the case that an eNB uses four transmission antennas, reference signals for four transmission antenna ports are arrayed using the TDM and/or FDM schemes. Channel information measured by the reception side (i.e., UE) of a downlink signal may be used to demodulate data transmitted using a transmission scheme, such as single transmission antenna transmission, transmission diversity, closed-loop spatial multiplexing, open-loop spatial multiplexing or a multi-user-multi-input/output (MIMO) antenna.

In the case that a multi-input multi-output antenna is supported, when a RS is transmitted by a specific antenna port, the RS is transmitted in the locations of resource elements specified depending on a pattern of the RS and is not transmitted in the locations of resource elements specified for other antenna ports. That is, RSs between different antennas do not overlap.

The rule of mapping a CRS to a resource block is defined as below.

$$k = 6m + (v + v_{shift}) \bmod 6 \qquad \text{[Equation 1]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 1, k and l represent the subcarrier index and the symbol index, respectively and p represents the antenna port. $N_{symb}^{DL}$ represents the number of OFDM symbols in one downlink slot and $N_{RB}^{DL}$ represents the number of radio resources allocated to the downlink, ns represents a slot index and, represents a cell ID. The mod represents an modulo operation. The position of the reference signal varies depending on the $v_{shift}$ value in the frequency domain. Since $v_{shift}$ is subordinated to the cell ID, the position of the reference signal has various frequency shift values according to the cell.

In more detail, the position of the CRS may be shifted in the frequency domain according to the cell in order to improve channel estimation performance through the CRS. For example, when the reference signal is positioned at an interval of three subcarriers, reference signals in one cell are allocated to a 3k-th subcarrier and a reference signal in another cell is allocated to a 3k+1-th subcarrier. In terms of one antenna port, the reference signals are arrayed at an interval of six resource elements in the frequency domain and separated from a reference signal allocated to another antenna port at an interval of three resource elements.

In the time domain, the reference signals are arrayed at a constant interval from symbol index 0 of each slot. The time interval is defined differently according to a cyclic shift length. In the case of the normal cyclic shift, the reference signal is positioned at symbol indexes 0 and 4 of the slot and in the case of the extended CP, the reference signal is positioned at symbol indexes 0 and 3 of the slot. A reference signal for an antenna port having a maximum value between two antenna ports is defined in one OFDM symbol. Therefore, in the case of transmission of four transmitting antennas, reference signals for reference signal antenna ports 0 and 1 are positioned at symbol indexes 0 and 4 (symbol indexes 0 and 3 in the case of the extended CP) and reference signals for antenna ports 2 and 3 are positioned at symbol index 1 of the slot. The positions of the reference signals for antenna ports 2 and 3 in the frequency domain are exchanged with each other in a second slot.

Hereinafter, when the DRS is described in more detail, the DRS is used for demodulating data. A precoding weight used for a specific UE in the MIMO antenna transmission is used without a change in order to estimate a channel associated with and corresponding to a transmission channel transmitted in each transmitting antenna when the terminal receives the reference signal.

The 3GPP LTE system (for example, release-8) supports a maximum of four transmitting antennas and a DRS for rank 1 beamforming is defined. The DRS for the rank 1 beamforming also means a reference signal for antenna port index 5.

A rule of mapping the DRS to the resource block is defined as below. Equation 2 shows the case of the normal CP and Equation 3 shows the case of the extended CP.

[Equation 2]

$$k = (k') \bmod N_{sc}^{RB} + N_{sc}^{RB} \cdot n_{PRB}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \qquad \text{[Equation 3]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 3 and 4, k and l represent the subcarrier index and the symbol index, respectively and p represents the antenna port. $N_{sc}^{RB}$ represents the size of the resource block in the frequency domain and is expressed as the number of subcarriers. $n_{PRB}$ represents the number of physical resource blocks. $N_{RB}^{PDSCH}$ represents a frequency band of the resource block for the PDSCH transmission. ns represents the slot index and $N_{ID}^{cell}$ represents the cell ID. The mod represents the modulo operation. The position of the reference signal varies depending on the value in the frequency domain. Since $v_{shift}$ is subordinated to the cell ID, the position of the reference signal has various frequency shift values according to the cell.

In an LTE-A system of an evolved form of the LTE system, the design needs to be performed to support a maximum of 8 transmission antennas in the downlink of a base station. Accordingly, an RS for the maximum of 8 transmission antennas must be also supported. In the LTE system, only a downlink RS for a maximum of 4 antenna ports has been defined. In the case that a base station has 4 or a maximum of 8 downlink transmission antennas in the LTE-A system, an RS for such antenna ports needs to be additionally defined and designed. Regarding the RS for a maximum of 8 transmission antenna ports, both the above-described RS for channel measurement and the above-described RS for data demodulation must be designed.

One of important considerations in designing an LTE-A system is backward compatibility. That is, an LTE user equipment must well operate in the LTE-A system without any difficulty, and the system must support this. From a viewpoint of RS transmission, an RS for a maximum of 8 transmission antenna ports must be additionally defined in the time-frequency domain in which a CRS defined in LTE is transmitted every subframe in a full band. In the LTE-A system, if an RS pattern for the maximum of 8 transmission antenna is added to a full band every subframe using a method, such as that for the CRS of the existing LTE, RS overhead excessively increases.

Accordingly, an RS newly designed in the LTE-A system may be basically divided into two types, that is, an RS for channel measurement for the selection of an MCS, PMI, and the like (channel state information-RS, channel state indication-RS (CSI-RS), etc.) and a data demodulation (DM)-RS for data demodulation transmitted in 8 transmission antennas.

The existing CRS is used for channel measurement, the measurement of handover, etc. and for data demodulation, whereas the CSI-RS for channel measurement is designed for a channel measurement-oriented purpose. Furthermore, the CSI-RS for channel measurement may also be used for the measurement of handover. Since the CSI-RS is used to obtain information on the channel state only, it does not need to be transmitted every subframe unlike the CRS. In order to reduce overhead of the CSI-RS, the CSI-RS is intermittently transmitted on the time axis.

A DM-RS is dedicatedly transmitted to a UE scheduled in a corresponding time-frequency domain for data demodulation. That is, the DM-RS of a specific UE is transmitted only in a region in which a corresponding UE is scheduled, that is, only in a time-frequency domain in which data is received.

In the LTE-A system, an eNB has to transmit a CSI-RS for all antenna ports. To transmit a CSI-RS for a maximum of 8 transmission antenna ports every subframe has a disadvantage in that overhead is too great. Accordingly, the CSI-RS is not transmitted every subframe, but needs to be intermittently transmitted in the time axis in order to reduce corresponding overhead. That is, the CSI-RS may be periodically transmitted in the period of a multiple of one subframe or may be transmitted in a specific transmission pattern. In this case, the period or pattern in which the CSI-RS is transmitted may be configured by the eNB.

In order to measure a CSI-RS, a UE must be aware of the transmission subframe index of a CSI-RS for each CSI-RS antenna port of a cell to which the UE belongs, a CSI-RS resource element (RE) time-frequency position within the transmission subframe, and information on a CSI-RS sequence.

In the LTE-A system, an eNB needs to transmit a CSI-RS with respect to each of a maximum of 8 antenna ports. Resources used for the CSI-RS transmission of different antenna ports need to be orthogonal. When one eNB transmits CSI-RSs for different antenna ports, it may orthogonally allocate resources according to the FDM/TDM scheme by mapping the CSI-RSs for the respective antenna ports to different REs. Alternatively, the eNB may transmit the CSI-RSs for different antenna ports according to a CDM scheme for mapping the CSI-RSs to orthogonal codes.

When an eNB notifies its own cell UE of information on a CSI-RS, first, it has to notify the UE of information on a time-frequency to which a CSI-RS for each antenna port is mapped. Specifically, the information includes subframe numbers in which a CSI-RS is transmitted or the period in which a CSI-RS is transmitted, a subframe offset in which a CSI-RS is transmitted, an OFDM symbol number in which a CSI-RS RE of a specific antenna is transmitted, frequency spacing, an offset or shift value of an RE in the frequency axis, and so on.

Communication System Using Ultra High Frequency Band

In a long term evolution (LTE)/LTE advanced (LTE-A) system, error values of an oscillator between the UE and the base station are defined as requirement, and are described as follows.

UE side frequency error (in TS 36.101)

The UE modulated carrier frequency shall be accurate to within ±0.1 PPM observed over a period of one time slot (0.5 ms) compared to the carrier frequency received from the E-UTRA Node B eNB side frequency error (in TS 36.104)

Frequency error is the measure of the difference between the actual BS transmit frequency and the assigned frequency.

Meanwhile, the accuracy of the oscillator according to the type of base stations is shown in the following Table 3.

TABLE 3

| BS class | Accuracy |
|---|---|
| Wide Area BS | ±0.05 ppm |
| Local Area BS | ±0.1 ppm |
| Home BS | ±0.25 ppm |

Therefore, a maximum difference of the oscillator between the base station and the UE is ±0.1 ppm, and when an error occurs in one direction, a maximum offset value of 0.2 ppm may occur. This offset value is multiplied by a center frequency and converted into Hz units for each center frequency.

On the other hand, in the OFDM system, the CFO value appears differently according to a frequency tone subspacing, and in general, even the large CFO value has a relatively small effect on the OFDM system having a sufficiently large frequency tone sub spacing. Therefore, the actual CFO value (absolute value) needs to be represented by a relative value affecting the OFDM system, which is called a normalized CFO. The normalized CFO is represented by a value obtained by dividing the CFO value by the frequency tone subspacing. The following Table 4 shows the CFO and the normalized CFO for each center frequency and the error values of the oscillator.

TABLE 4

| Center frequency (subcarrier spacing) | Oscillator Offset | | | |
|---|---|---|---|---|
| | ±0.05 ppm | ±0.1 ppm | ±10 ppm | ±20 ppm |
| 2 GHz (15 kHz) | ±100 Hz (±0.0067) | ±200 Hz (±0.0133) | ±20 kHz (±1.3) | ±40 kHz (±2.7) |

TABLE 4-continued

| Center frequency (subcarrier spacing) | Oscillator Offset | | | |
|---|---|---|---|---|
| | ±0.05 ppm | ±0.1 ppm | ±10 ppm | ±20 ppm |
| 30 GHz (104.25 kHz) | ±1.5 kHz (±0.014) | ±3 kHz (±0.029) | ±300 kHz (±2.9) | ±600 kHz (±5.8) |
| 60 GHz (104.25 kHz) | ±3 kHz (±0.029) | ±6 kHz (±0.058) | ±600 kHz (±5.8) | ±1.2 MHz (±11.5) |

In Table 4, when the center frequency is 2 GHz (for example, LTE Rel-8/9/10), the frequency tone subspacing is assumed to be (15 kHz), and when the center frequency is 30 GHz and 60 GHz, the frequency tone subspacing is 104.25 kHz, thereby preventing the performance deterioration considering the Doppler effect for each center frequency. Table 2 above is a mere example, and it is obvious that different frequency tone subspacings may be used for the center frequency.

On the other hand, in a situation where the UE moves at a high speed or in a high frequency band, a Doppler spread phenomenon greatly occurs. The Doppler spread causes dispersion in the frequency domain, resulting in the distortion of the received signal from the viewpoint of the receiver. The Doppler variance can be represented by $f_{doppler}=(v/\lambda)\cos\theta$. In this case, v represents a moving speed of the UE, and $\lambda$ represents a wavelength of the center frequency of the radio wave transmitted. $\theta$ represents an angle between the received radio wave and the moving direction of the UE. The following description is based on the assumption that $\theta$ is zero.

In this case, the coherence time is in inverse proportion to the Doppler spread. If the coherence time is defined as a time interval in which the correlation value of the channel response in the time domain is 50% or more, the coherence time is represented by $$T_c \approx \frac{9}{16\pi f_{doppler}}.$$

In the wireless communication system, the following Equation 4 which represents a geometric mean between the equation for the Doppler spread and the equation for the coherence time is mainly used.

[Equation 4]

$$T_c = \sqrt{\frac{9}{16\pi f_{doppler}}} = \frac{0.423}{f_{doppler}}$$

Figure 6:
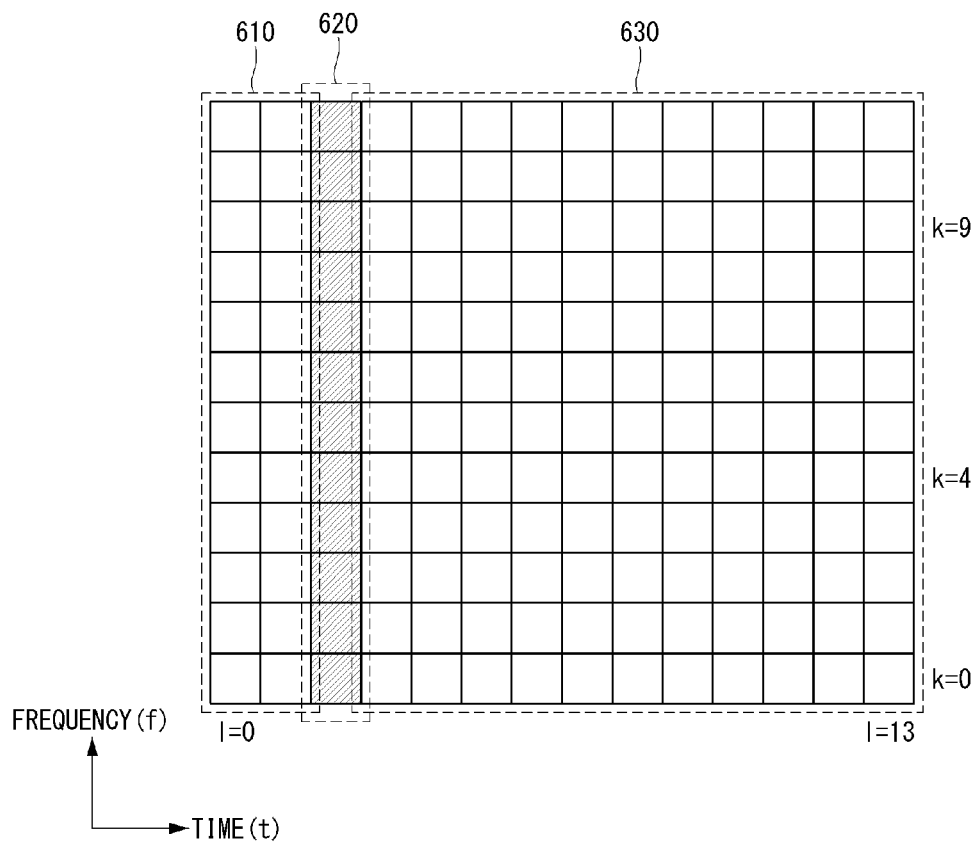
FIG. 6 is a diagram illustrating an example of a resource area structure used in a communication system using mmWave to which the present invention can be applied.

FIG. 6 illustrates an example of a resource area structure used in a communication system using mmWave to which the present invention can be applied.

The communication system using the ultra high frequency band such as mmWave uses a frequency band different in physical properties from the conventional LTE/LTE-A communication system. Accordingly, in the communication system using the ultra high frequency band, a resource structure having a form different from that of the resource region used in the conventional communication system is being discussed. FIG. 6 shows an example of a downlink resource structure of a new communication system.

Considering a resource block pair (RB pair) including 14 orthogonal frequency division multiplexing (OFDM) symbols on a horizontal axis and 12 frequency tones on a vertical axis, first two (or three) OFDM symbols 1310 may be allocated to a control channel (for example, a physical downlink control channel (PDCCH)), the next one to two OFDM symbols 620 may be allocated a DeModulation reference signal (DMRS), and the remaining OFDM symbols may be allocated a data channel (for example, physical downlink shared channel (PDSCH)).

Meanwhile, in the resource region structure as shown in FIG. 6, PCRS or PNRS or PTRS for the CPE (or CFO) estimation described above may be carried on a part of a resource element (RE) of the region 630 to which the data channel is allocated and transmitted to the UE. Such a signal is a signal for estimating phase noise, and may be a pilot signal as described above or a signal whose data signal is changed or duplicated.

The present invention proposes a method of transmitting DMRS for channel estimation in downlink or uplink.

FIGS. 7A through 8B are diagrams illustrating an example of a pattern of a demodulation reference signal proposed herein.

Reference to FIGS. 7A through 8B, a demodulation reference signal for estimating a channel may be mapped to one symbol or two symbols according to the maximum number of antenna ports.

Figure 7A:
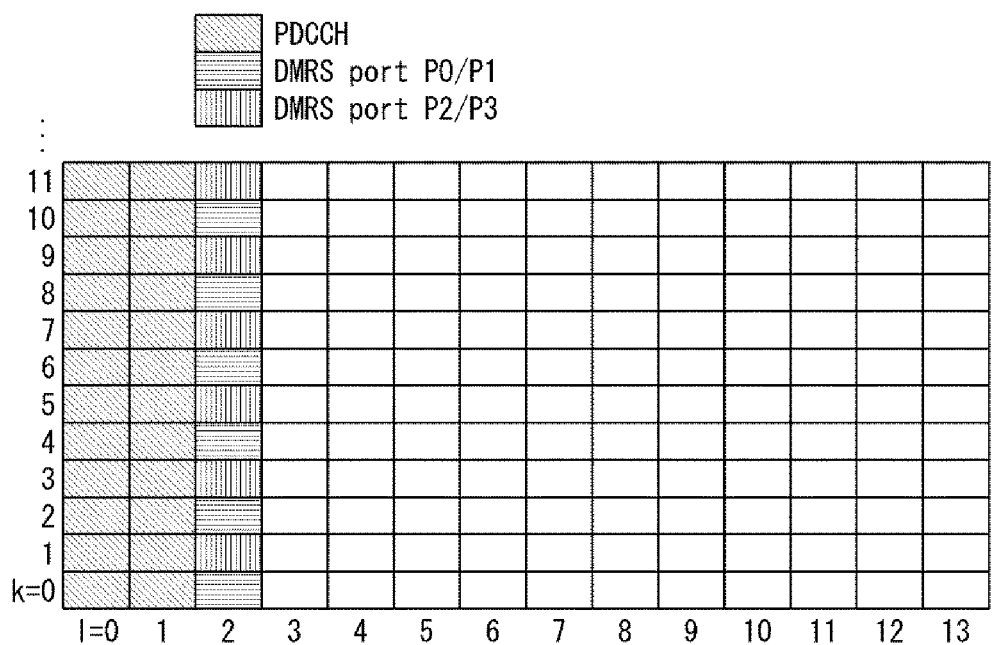
FIGS. 7A through 8B are diagrams illustrating an example of a pattern of a demodulation reference signal proposed herein.
Figure 7B:
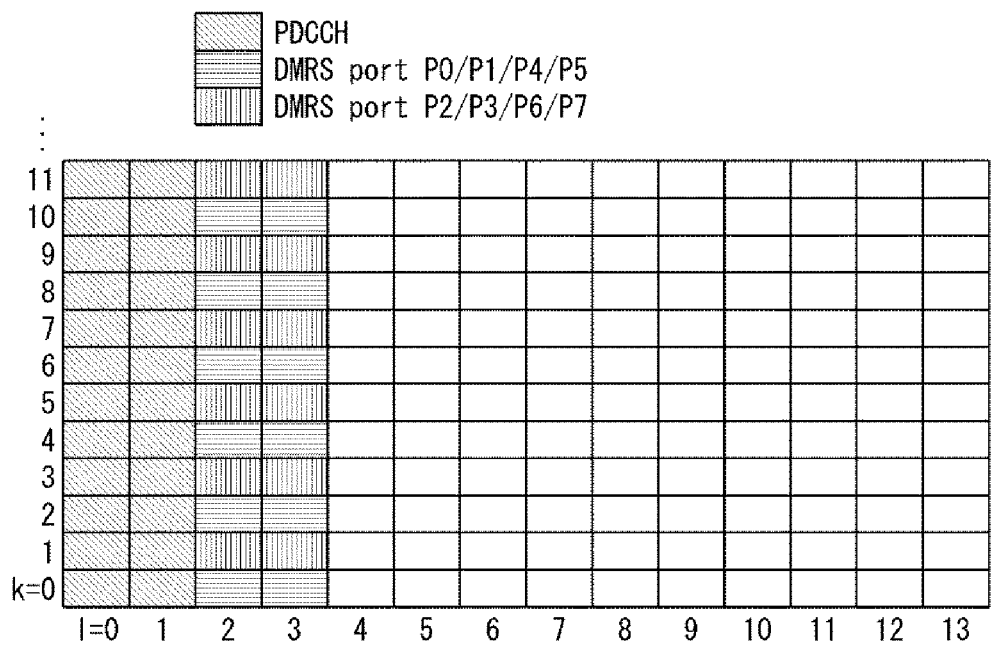
Figure 8A:
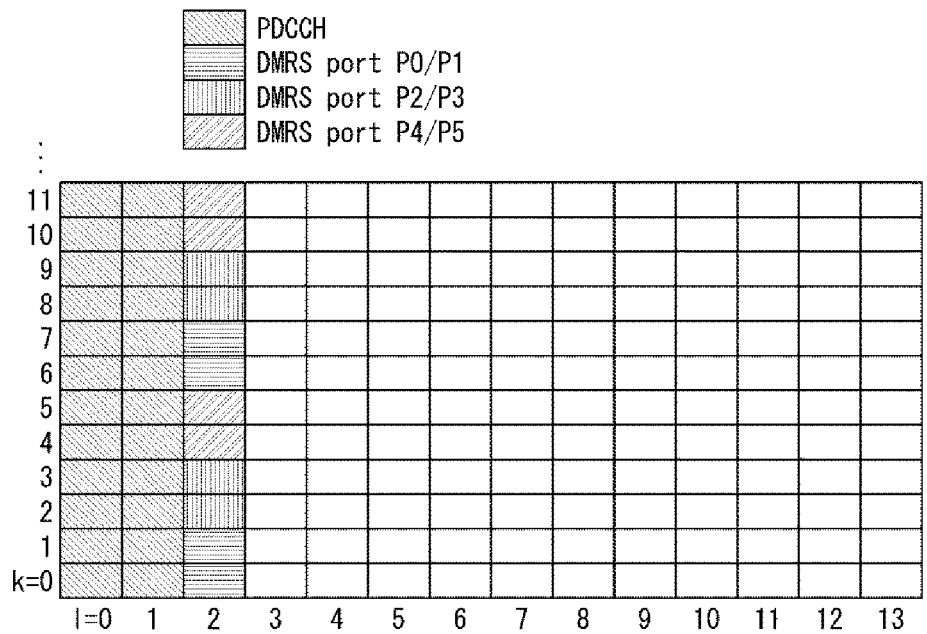
Figure 8B:
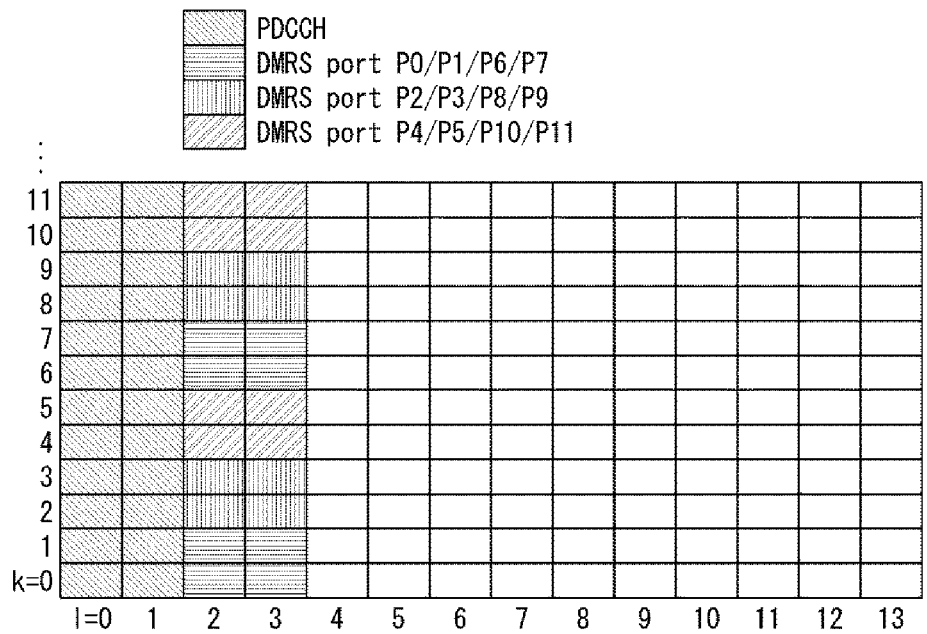

In detail, the uplink DMRS and the downlink DMRS may be generated and mapped to the resource region by the following method. FIGS. 7A and 7B illustrate an example of an uplink or downlink DMRS mapped to a physical resource according to type 1, and FIGS. 8A and 8B illustrate an example of an uplink or downlink DMRS mapped to a physical resource according to type 2.

Demodulation Reference Signal for PUSCH

A reference signal sequence r(m) for generating the downlink DMRS is generated by the following Equation 5 when transform precoding for PUSCH is not allowed.

In this case, an example of the case where the transform precoding for the PUSCH is not allowed may be a case of generating a transmission signal of a CP-OFDM scheme $$r(m) = \frac{1}{\sqrt{2}}(1 - 2 \cdot c(2m)) + j\frac{1}{\sqrt{2}}(1 - 2 \cdot c(2m+1))$$ [Equation 5]

Here, c(i) means a pseudo-random sequence.

If the transform precoding for the PUSCH is allowed, the reference signal sequence r(m) is generated by the following Equation 6.

In this case, an example of the case where the transform precoding for the PUSCH is allowed may be a case of generating a transmission signal of a DFT-S-OFDM scheme.

$$r(m) = e^{-j\frac{\pi qm(m+1)}{L}}$$ [Equation 6]

The DMRS of the PUSCH generated is mapped to a physical resource according to type 1 or type 2 given by higher layer parameters as illustrated in FIGS. 8 and 9.

In this case, the DMRS may be mapped to a single symbol or a double symbol according to the number of antenna ports.

If the transform precoding is not allowed, the reference signal sequence r(m) may be mapped to the physical resource by the following Equation 7.

$$a_{k,l}^{(p,\mu)} = \beta_{DMRS} w_f(k') \cdot w_t(l') \cdot r(2m+k'+m_0) \quad \text{[Equation 7]}$$

$$k = \begin{cases} k_0 + 4m + 2k' + \Delta & \text{Configuration type 1} \\ k_0 + 6m + k' + \Delta & \text{Configuration type 2} \end{cases}$$

$k'=0,1$ $l=\bar{l}+l'$

In the above Equation 7, l is defined relative to the start of the PUSCH transmission, and $w_f(k')$, $w_t(l')$, and $\Delta$ are given by the following Tables 5 and 6.

The following Table 5 shows an example of parameters for the DMRS of the PUSCH for type 1.

TABLE 5

| | | $w_f(k')$ | | $w_t(l')$ | |
|---|---|---|---|---|---|
| p | Δ | k' = 0 | k' = 1 | l' = 0 | l' = 1 |
| 1000 | 0 | +1 | +1 | +1 | +1 |
| 1001 | 0 | +1 | −1 | +1 | +1 |
| 1002 | 1 | +1 | +1 | +1 | +1 |
| 1003 | 1 | +1 | −1 | +1 | +1 |
| 1004 | 0 | +1 | +1 | +1 | −1 |
| 1005 | 0 | +1 | −1 | +1 | −1 |
| 1006 | 1 | +1 | +1 | +1 | −1 |
| 1007 | 1 | +1 | −1 | +1 | −1 |

The following Table 6 below shows an example of parameters for the DMRS of the PUSCH for type 2.

TABLE 6

| | | $w_f(k')$ | | $w_t(l')$ | |
|---|---|---|---|---|---|
| p | Δ | k' = 0 | k' = 1 | l' = 0 | l' = 1 |
| 1000 | 0 | +1 | +1 | +1 | +1 |
| 1001 | 0 | +1 | −1 | +1 | +1 |
| 1002 | 2 | +1 | +1 | +1 | +1 |
| 1003 | 2 | +1 | −1 | +1 | +1 |
| 1004 | 4 | +1 | +1 | +1 | +1 |
| 1005 | 4 | +1 | −1 | +1 | +1 |
| 1006 | 0 | +1 | +1 | +1 | −1 |
| 1007 | 0 | +1 | −1 | +1 | −1 |
| 1008 | 2 | +1 | +1 | +1 | −1 |
| 1009 | 2 | +1 | −1 | +1 | −1 |
| 1010 | 4 | +1 | +1 | +1 | −1 |
| 1011 | 4 | +1 | −1 | +1 | −1 |

The following Table 7 shows an example of a time domain index l' and a supported antenna port p according to a higher layer parameter UL_DMRS_dur.

TABLE 7

| | | p | |
|---|---|---|---|
| UL_DMRS_dur | l' | Type 1 | Type 2 |
| Single-symbol DMRS | 0 | 1000-1003 | 1000-1005 |
| Double-symbol DMRS | 0, 1 | 1000-1007 | 1000-1011 |

The following Table 8 shows an example of a start position $\bar{l}$ of the DMRS of the PUSCH.

TABLE 8

| | $\bar{l}$ | | | |
|---|---|---|---|---|
| | Single symbol DMRS | | Double symbol DMRS | |
| Uplink DMRS parameter | PUSCH mapping type A | PUSCH mapping type B | PUSCH mapping type A | PUSCH mapping type B |
| 0 | $l_0$ | $l_0$ | $l_0$ | $l_0$ |
| 1 | $l_0$, 7 | | | |
| 2 | $l_0$, 9 | | | |
| 3 | $l_0$, 11 | | | |

Demodulation Reference Signals for PDSCH

The reference signal sequence r(m) for generating the downlink DMRS is generated by the following Equation 8.

[Equation 8]

$$r(m) = \frac{1}{\sqrt{2}}(1 - 2 \cdot c(2m)) + j\frac{1}{\sqrt{2}}(1 - 2 \cdot c(2m+1))$$

Here, c(i) means a pseudo-random sequence.

Figure 9A:
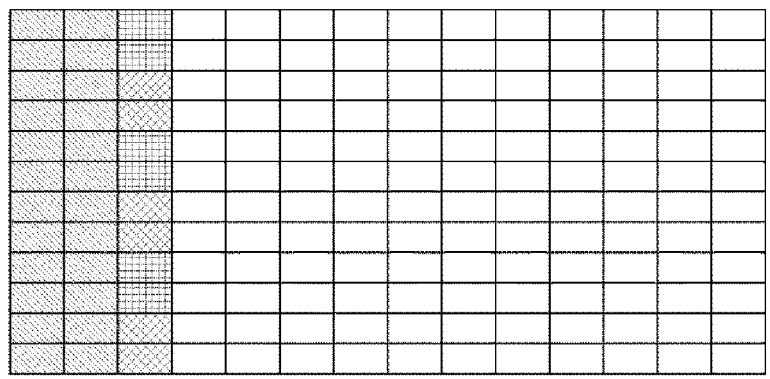
FIGS. 9A to 13C are diagrams illustrating an example of a method for mapping DMRSs using a repetition pattern proposed herein.
Figure 9B:
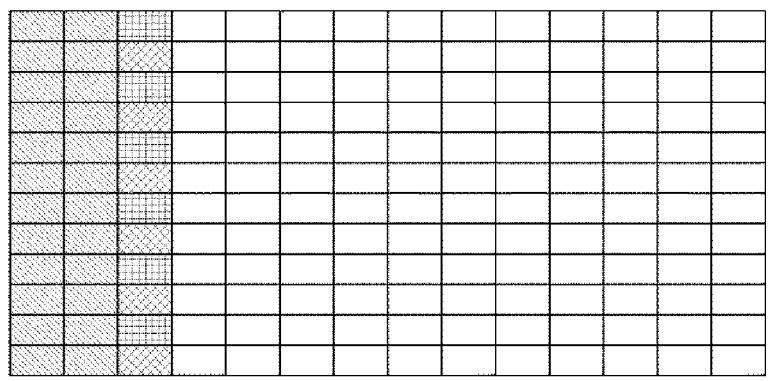
Figure 9C:
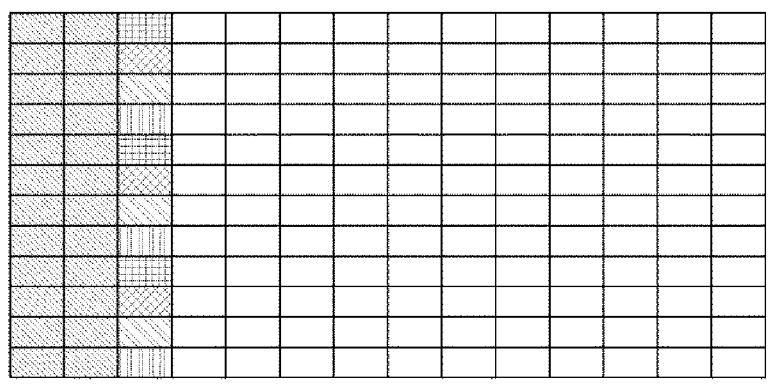

The DMRS of the PDSCH generated is mapped to a physical resource according to type 1 or type 2 given by higher layer parameters as illustrated in FIGS. 8A and 9C.

In this case, the reference signal sequence r(m) may be mapped to a physical resource by the following Equation 9.

$$a_{k,l}^{(p,\mu)} = \beta_{DMRS} w_f(k') \cdot w_t(l') \cdot r(2m+k'+m_0) \quad \text{[Equation 9]}$$

$$k = \begin{cases} k_0 + 4m + 2k' + \Delta & \text{Configuration type 1} \\ k_0 + 6m + k' + \Delta & \text{Configuration type 2} \end{cases}$$

$k'=0,1$ $l=\bar{l}+l'$

In the above Equation 9, l is defined relative to the start of the slot, and $w_f(k')$, $w_t(l')$ and Δ are given by the following Tables 11 and 12.

The time axis index l' and the supported antenna ports p vary depending on the higher layer parameter DL_DMRS_dur according to the following Table 12. The $\bar{l}$ value varies depends on a higher layer parameter DL_DMRS_add_pos given in Table 13, according to the mapping type:

For PDSCH mapping type A: if the higher layer parameter DL_DMRS_typeA_pos is equal to 3, then l0=3 and otherwise l0=2.

For PDSCH mapping type B: l0 is mapped to the first OFDM symbol in the PDSCH resource for which the DMRS is scheduled.

The following Table 9 shows an example of parameters for the DMRS configuration type 1 of the PDSCH.

TABLE 9

| | | $w_f(k')$ | | $w_t(l')$ | |
|---|---|---|---|---|---|
| p | Δ | k' = 0 | k' = 1 | l' = 0 | l' = 1 |
| 1000 | 0 | +1 | +1 | +1 | +1 |
| 1001 | 0 | +1 | −1 | +1 | +1 |

TABLE 9-continued

| | | $w_f(k')$ | | $w_t(l')$ | |
|---|---|---|---|---|---|
| p | Δ | k' = 0 | k' = 1 | l' = 0 | l' = 1 |
| 1002 | 1 | +1 | +1 | +1 | +1 |
| 1003 | 1 | +1 | −1 | +1 | +1 |
| 1004 | 0 | +1 | +1 | +1 | −1 |
| 1005 | 0 | +1 | −1 | +1 | −1 |
| 1006 | 1 | +1 | +1 | +1 | −1 |
| 1007 | 1 | +1 | −1 | +1 | −1 |

The following Table 10 shows an example of parameters for the DMRS configuration type 2 of the PDSCH.

TABLE 10

| | | $w_f(k')$ | | $w_t(l')$ | |
|---|---|---|---|---|---|
| p | Δ | k' = 0 | k' = 1 | l' = 0 | l' = 1 |
| 1000 | 0 | +1 | +1 | +1 | +1 |
| 1001 | 0 | +1 | −1 | +1 | +1 |
| 1002 | 2 | +1 | +1 | +1 | +1 |
| 1003 | 2 | +1 | −1 | +1 | +1 |
| 1004 | 4 | +1 | +1 | +1 | +1 |
| 1005 | 4 | +1 | −1 | +1 | +1 |
| 1006 | 0 | +1 | +1 | +1 | −1 |
| 1007 | 0 | +1 | −1 | +1 | −1 |
| 1008 | 2 | +1 | +1 | +1 | −1 |
| 1009 | 2 | +1 | −1 | +1 | −1 |
| 1010 | 4 | +1 | +1 | +1 | −1 |
| 1011 | 4 | +1 | −1 | +1 | −1 |

The following Table 11 shows an example of l' which is a duration of PDSCH DMRS.

TABLE 11

| | | p | |
|---|---|---|---|
| DL_DMRS_dur | l' | Type 1 | Type 2 |
| Single-symbol DMRS | 0 | 1000-1003 | 1000-1005 |
| Double-symbol DMRS | 0, 1 | 1000-1007 | 1000-1011 |

The following Table 12 shows an example of a start position $\bar{l}$ of the DMRS of the PUSCH.

TABLE 12

| | $\bar{l}$ | | | |
|---|---|---|---|---|
| | Single symbol DMRS | | Double symbol DMRS | |
| Downlink DMRS Parameter | PDSCH mapping type A | PDSCH mapping type B | PDSCH mapping type A | PDSCH mapping type B |
| 0 | $l_0$ | $l_0$ | $l_0$ | $l_0$ |
| 1 | $l_0$, 7 | | | |
| 2 | $l_0$, 9 | | | |
| 3 | $l_0$, 11 | | | |

In the NR system, as described above, the DMRS is defined in units of OFDM symbols. In order to support the fast decoding speed, the DMRS is placed in the front symbol of the slot.

The DMRS located at the front symbol of the slot may be called a front-loaded DMRS.

In the present invention, the DMRS located in the front symbol of the slot is called a first DMRS or a front-loaded DMRS for fast decoding. However, in the case of the high Doppler environment, since a channel variation is large within one slot (or subframe), it is difficult to appropriately compensate for the channel using only the DMRS set in the front symbol.

Accordingly, in order to solve this problem, additional DMRS can be set. In the present invention, the DMRS is referred to as second DMRS or additional DMRS.

FIGS. 9A to 13C are diagrams illustrating an example of a method for mapping DMRSs using a repetition pattern proposed herein.

Referring to FIGS. 9A to 13C, when the number of antenna ports used for transmitting the DMRS is a predetermined number or more, the base station may repeat the same mapping pattern to map the DMRS to a resource.

Figure 10A:
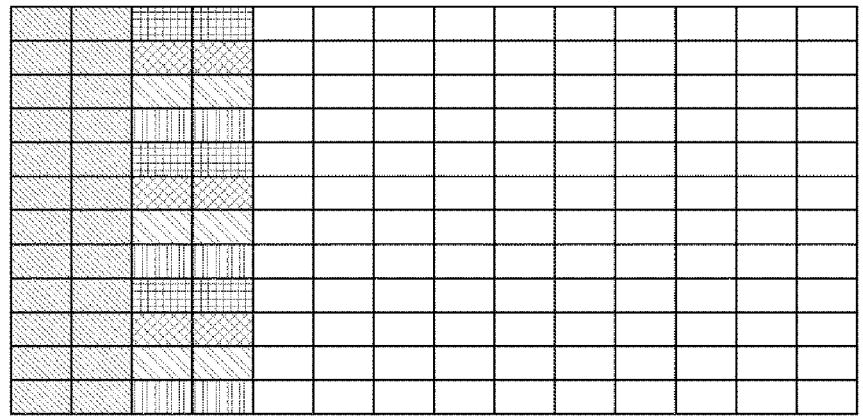
Figure 10B:
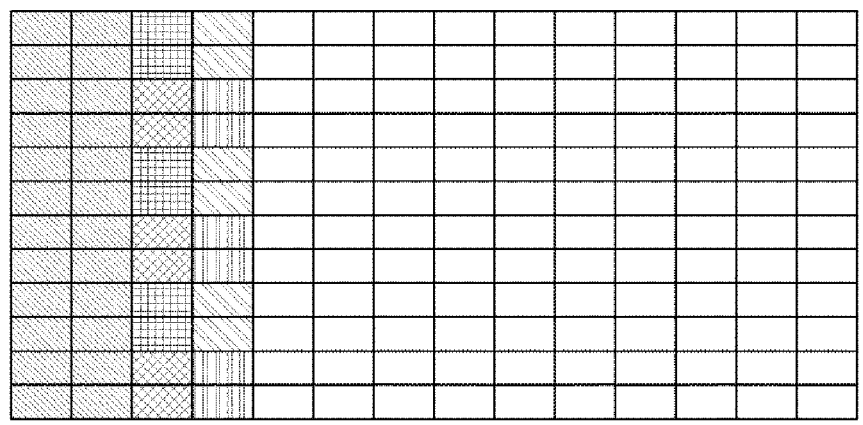
Figure 10C:
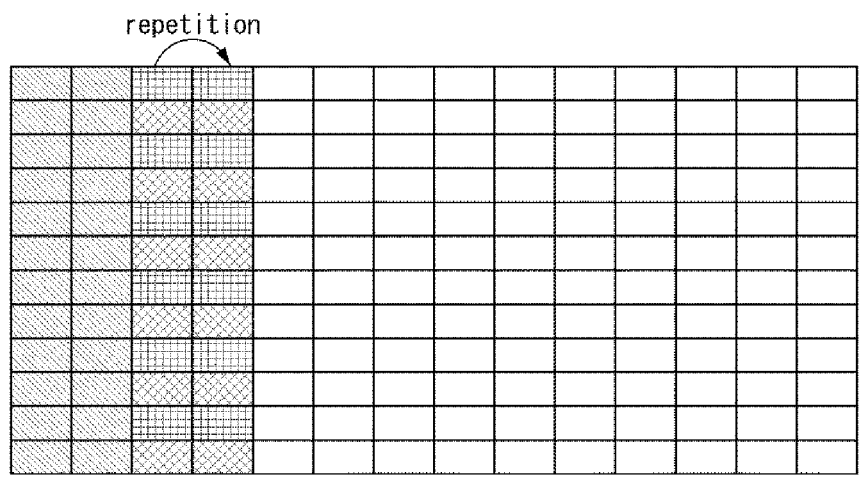

FIGS. 9A to 10C illustrate examples of DMRS mapping patterns for supporting up to 8 DMRS ports. FIGS. 9A to 9C illustrate examples of a mapping pattern for mapping DMRSs using one OFDM symbol, and FIGS. 10A to 10C illustrate examples of a mapping pattern for mapping DMRSs using two OFDM symbols.

Specifically, FIGS. 9A to 9B show an example of supporting eight DMRS ports using the CDM in the frequency domain corresponding to length 4 and FDM using two different resources.

On the other hand, FIG. 9C shows an example of supporting eight DMRS ports using the CDM in the frequency domain corresponding to length 2 and FDM using four different resources.

FIG. 10A shows an example of supporting eight DMRS ports using the CDM in the time domain corresponding to length 2 and FDM using four different resources. On the other hand, FIG. 10B shows an example of supporting eight DMRS ports using the CDM in the frequency domain corresponding to length 2 and FDM and TDM using two different resources.

FIG. 10C shows an example of mapping DMRSs using a repetition pattern repeating the same pattern.

In FIG. 10C, the DMRS mapping pattern includes two OFDM symbols, but the actual eight DMRS ports are configured within one OFDM symbol and formed of a repetitive structure using the configuration.

Specifically, eight DMRS ports may be supported by the CDM in the frequency domain corresponding to length 4 and the FDM using two different resources.

Hereinafter, FIG. 9A is called pattern 5, FIG. 9B is called pattern 6, FIG. 9C is called pattern 7, FIG. 10A is called pattern 8, FIG. 10B is called pattern 9, and FIG. 10C is called pattern 10.

Figure 11:
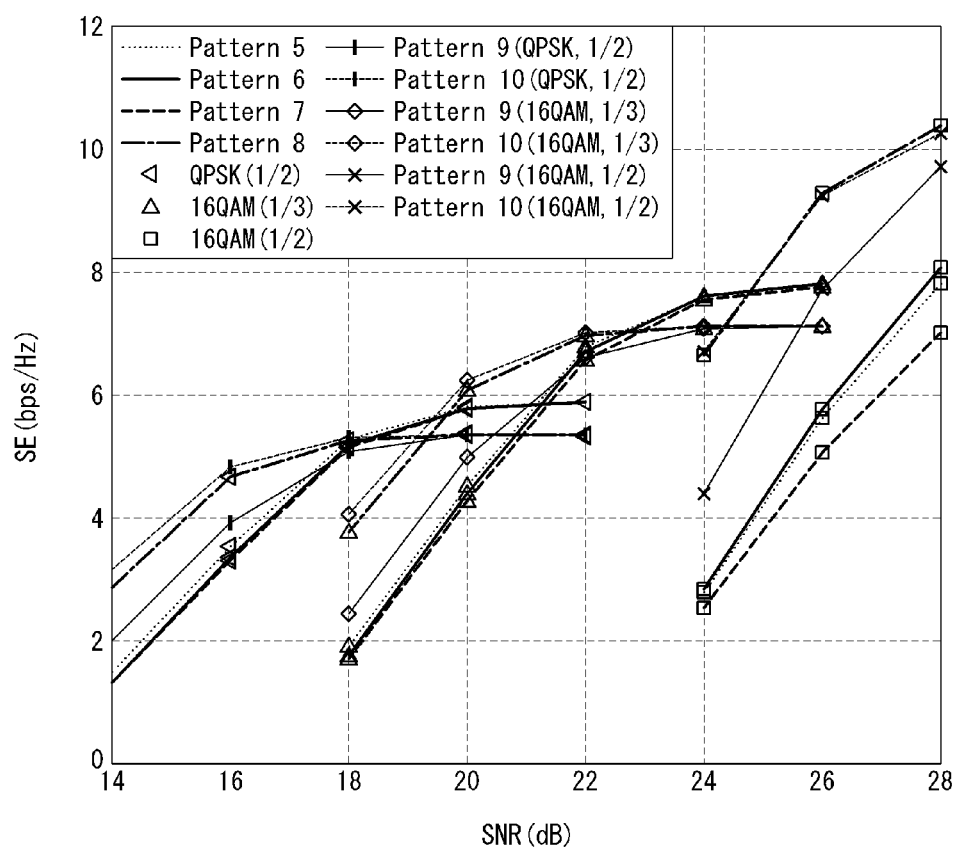

FIG. 11 is a diagram illustrating an example of spectral efficiency performance for each mapping pattern of FIGS. 9A to 10C.

As illustrated in FIG. 11, it can be confirmed that in the case of supporting eight DMRS ports, better SE performance is obtained compared to the mapping pattern including one OFDM symbol in pattern 8 and pattern 10 constituting the mapping pattern using two OFDM symbols.

In this case, in the case of pattern 9 using two OFDM symbols, it can be confirmed that performance deteriorates similarly to a pattern including one OFDM symbol.

This can be inferred that since pattern 9 uses TDM, the energy of the reference signal is smaller than that of other patterns using two OFDM symbols.

That is, in the case of the pattern 8 and the pattern 10, since the DMRSs are mapped by using two OFDM symbols for eight ports, the RS energy can be increased, so it is advantageous in the channel coefficient estimation.

In addition, the inter-layer interference is reduced due to the gain of the channel coefficient estimation, and as a result, the performance may be improved in terms of the SE even if the RS overhead is increased.

At this time, among the pattern 8 and the pattern 10 using two OFDM symbols, the pattern 10 may be a mapping pattern that is more suitable for a high carrier frequency (mmWave) band with a large influence of phase noise.

Specifically, in the case of the pattern 8, the CDM in the time domain is used. However, when a phase difference occurs between neighboring OFDM symbols due to the influence of the phase noise, performance may deteriorate in the case of the pattern using the CDM in the time domain that assumes the same channel between neighboring OFDM symbols as illustrated in the pattern 8.

On the other hand, sine the pattern 10 has a repetitive structure using the same pattern between the neighboring OFDM symbols, the error due to the phase noise can be estimated and compensated. In detail, by estimating a phase difference between neighboring OFDM symbols, and estimating a channel by compensating for the estimated phase difference, an error that may cause deterioration in channel estimation performance may be compensated in advance.

Therefore, when the number of antenna ports for transmitting the DMRS exceeds a certain number, the DMRS may be mapped to resources using the repetition pattern.

Specifically, when the number of antenna ports for DMRS transmission is more than a certain number, the base station may increase the CDM length in the frequency domain and repeatedly use the same pattern in the time domain.

In another embodiment of the present invention, the mapping pattern of the DMRS may be determined according to the transmission frequency.

In detail, in the high frequency band, the deterioration in the CDM performance may occur in the time domain due to the influence of phase noise. Therefore, the a repetition pattern that can estimate and compensate for the CPE due to the phase noise in the high frequency band, and provide the sufficient RS energy to prioritize the repetition pattern capable of improving the channel estimation performance.

Figure 12:
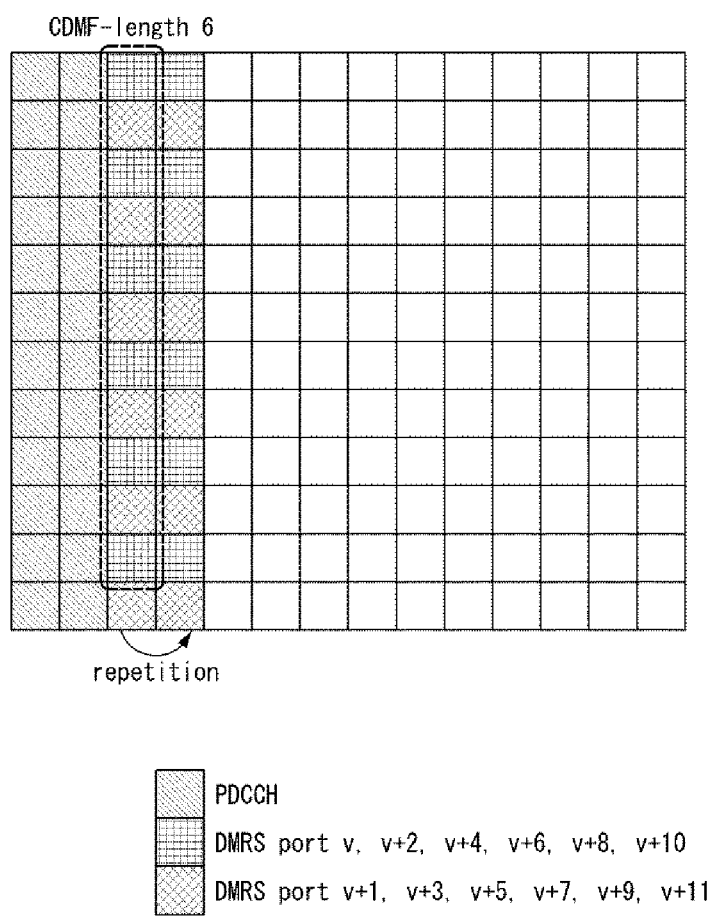

For example, if the maximum number of antenna ports is 12, the DMRS may be mapped as illustrated in FIG. 12.

That is, a mapping pattern configured to support up to 12 DMRS ports in one OFDM symbol may be defined to be repeated in the neighboring OFDM symbols.

In the above example, the CDM length in the frequency domain increases to support a plurality of DMRS ports in one OFDM symbol. In the case of a channel having a long delay spread, the channel estimation performance may deteriorate due to a channel having high frequency selectivity.

However, in the case of the high frequency band, propagation characteristics such as large path attenuation, strong straightness, and small transmittance are not good. In addition, with the use of the beamforming technology to compensate for large path attenuation, channels in the high frequency band have a reduced delay spread. Accordingly, the DMRS pattern having the repetition structure may be referred to as the mapping pattern suitable for the high frequency band.

Therefore, the transmission frequency band and the DMRS pattern which may be preferred in the corresponding frequency band may be determined by being tied to improve the channel estimation performance according to the frequency band.

According to another embodiment of the present invention, it may be determined whether to apply the CDM in the time domain according to the CDM length in the frequency domain or it is possible to limit the type of OCC code applied to the CDM in the time domain.

For example, FIG. 10A illustrates an example of supporting eight DMRS ports using the CDM in the time domain corresponding to length 2 and the FDM using four different resources. On the other hand, to support the same eight DMRS ports, as illustrated in FIG. 10C, the repetition pattern including the CDM in the frequency domain corresponding to length 4 and the FDM using two different resources may be used.

In the case of the high frequency domain, the CDM in the time domain causes the deterioration in the channel estimation performance due to the effect of phase noise. Accordingly, in the case of the high frequency domain, the effect of the phase noise may be estimated using the pattern having the long CDM length and repeating the same among the two mapping patterns supporting the eight DMRS ports described above, that is, the pattern illustrated in FIG. 10C, and may be compensated at the time of the channel estimation.

As in the above example, the application of the CDM in the time domain or the DMRS mapping pattern may vary according to the CDM length in the frequency domain. As such, the base station may set, in the UE, the DMRS mapping pattern and whether to apply the CDM in the time domain based on the CDM length in the frequency domain.

When the DMRS is mapped using the repetition pattern, whether to repeat the pattern may be represented by the CDM on/off in the time domain or by a limitation of an OCC code applied to the CDM.

Figure 13A:
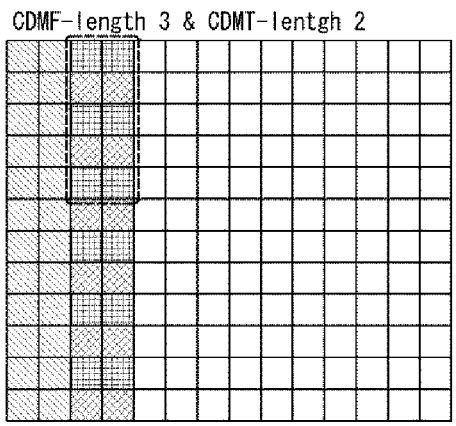

For example, as illustrated in FIG. 13A, when the CDM of length 3 is applied in the frequency domain and the CDM of length 2 is applied in the time domain, an OCC code of length 2 used in the time domain may be equal to [+1, +1], [+1, −1].

In this case, the number of ports multiplexed in the DMRS pattern may be 12 ports in total, but when only one OCC code in the time domain is used, multiplexing of a total of 6 ports is possible.

In this case, when the limitation is made to use only OCC codes [+1, +1], the same effect as using the repeating pattern may be obtained.

That is, as illustrated in FIG. 13A, when the CDM length in the frequency domain is 3, a total of 12 ports may be multiplexed using an OCC code having length 2 in the time domain.

Figure 13B:
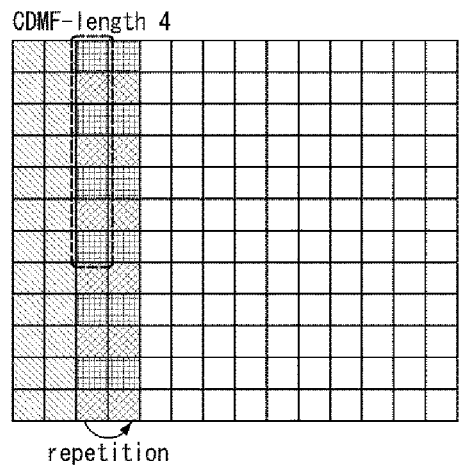
Figure 13C:
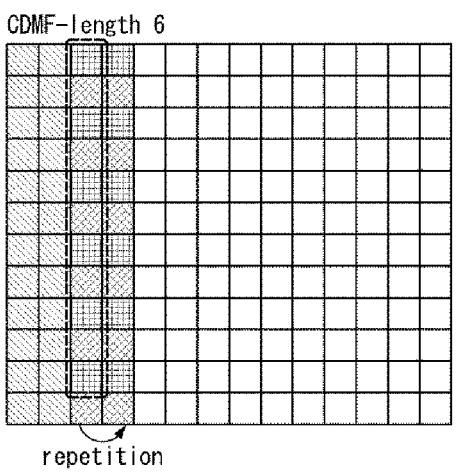

At this time, when the CDM length in the frequency domain is 4 or more as illustrated in FIGS. 13B and 13C, the same effect as using the repetition pattern may be generated by turning off the CDM in the time domain or limiting the type of OCC codes to one.

In this case, the base station may explicitly inform the UE of the limitation on whether to apply the CDM in the time domain or the type of OCC codes applied to the CDM through at least one of higher layer signaling (for example, RRC, MAC CE, and the like) or DCI.

Alternatively, the base station may inform the CDM length in the frequency domain through at least one of the higher layer signaling or the DCI, and the UE may recognize whether to apply the CDM in the time domain or the limitation of the OCC code applied to the CDM based on the CDM length transmitted from the base station.

In another embodiment of the present invention, the base station may inform the UE of the CDM on/off in the time domain or the type of OCC codes applied to the CDM in the time domain through the higher layer signaling or the DCI.

For example, the base station can directly inform the UE of the OCC length in the time domain through a phy layer or the DC.

In this case, if there is no limitation on the OCC code in the time domain, a total of 12 ports should be supported, but if there is a limitation, only a total of 6 ports will be supported, thereby reducing the amount of information to be displayed.

When the UE informs such information through the DCI, the UE may recognize whether the OCC code of the DMRS pattern is limited, so the UE may estimate the CPE and the CFO and then receive the DMRS that compensates for the estimated value.

When the base station does not explicitly inform the UE of the CDM on/off in the time domain or the type of OCC codes applied to the CDM in the time domain, it may be assumed that the UE is not MU-paired with other UEs having other OCC codes in the time domain based on a transmission frequency, whether to transmit the PTRS for estimating the phase error due to the phase noise, MCS, or the number of layers.

When the UE satisfies the proposed assumption, the UE may perform a reception operation of compensating for a phase difference between DMRS symbols due to CPEs appearing in each DMRS and then performing combining of concatenated DMRS symbols.

☐For example, when the UE uses a transmission frequency of mmWave band and the MCS uses 256QAM, a process of compensating for the phase difference between the concatenated DMRS symbols and then combining the concatenated DMRSs may be performed.☐

Even if there is no explicit signaling as in the example of the proposal, the base station may schedule to use only the same OCC code in the time domain by using other information transmitted to the UE.

In this case, the DMRS can be received under the assumption that the UE is not MU-pared in the specific environment, thereby preventing the deterioration due to the phase noise and performing the channel estimation.

Figure 14:
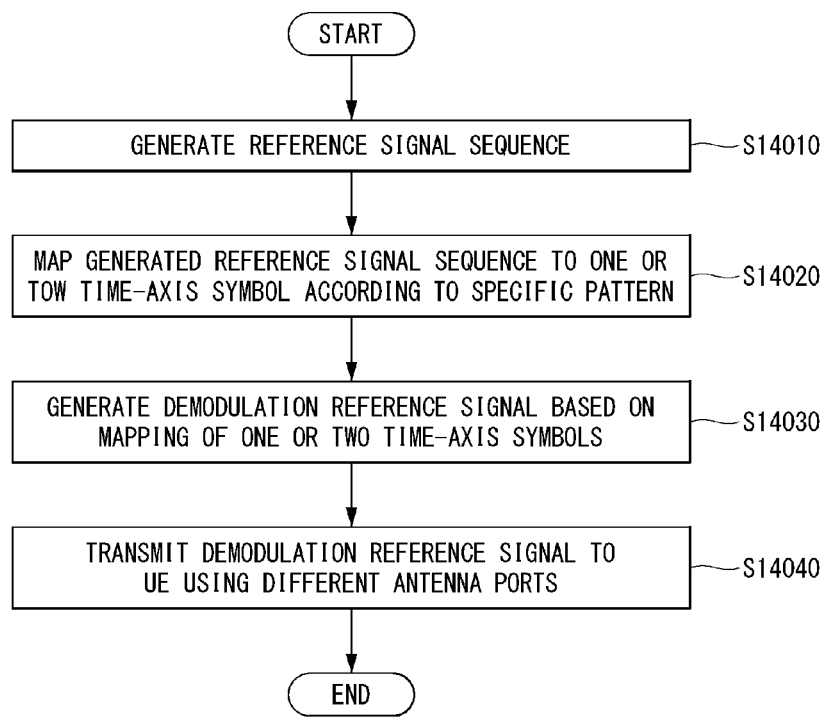
FIG. 14 is a flowchart illustrating an example of a method for generating and transmitting a demodulation reference signal proposed herein.

FIG. 14 is a flowchart illustrating an example of a method for generating and transmitting a demodulation reference signal proposed herein.

Referring to FIG. 14, the base station generates a reference signal sequence based on a pseudo random sequence (S14010). In this case, the demodulation reference signal may be the front-loaded DMRS described above.

Thereafter, the base station maps the generated reference signal sequence to one or two time-axis symbols according to a specific pattern (S14020). In this case, the base station may map the reference signal sequence generated according to the specific pattern to one or two time-axis symbols, and the specific pattern may be one of the patterns described with reference to FIGS. 7A to 13.

The specific pattern may be determined according to the characteristics of the frequency band in which the demodulation reference signal is transmitted.

As described with reference to FIGS. 7A to 13, the demodulation reference signal may be multiplexed and mapped to one or two time-axis symbols through the CDM on a frequency axis and/or a time axis.

At this time, the CDM applied on the time axis is called a first CDM, and the CDM applied on the frequency axis is called a second CDM.

Thereafter, the base station generates the demodulation reference signal based on the mapping of one or two time-axis symbols, and transmits the generated demodulation reference signal to the UE using different antenna ports (S14030 and S14040).

In this case, the demodulation reference signal sequence is mapped on the same time-axis symbol and transmitted on each specific antenna port, and the demodulation reference signal may be located on the same time-axis symbol as at least one other demodulation reference signal transmitted on another antenna port.

Figure 15:
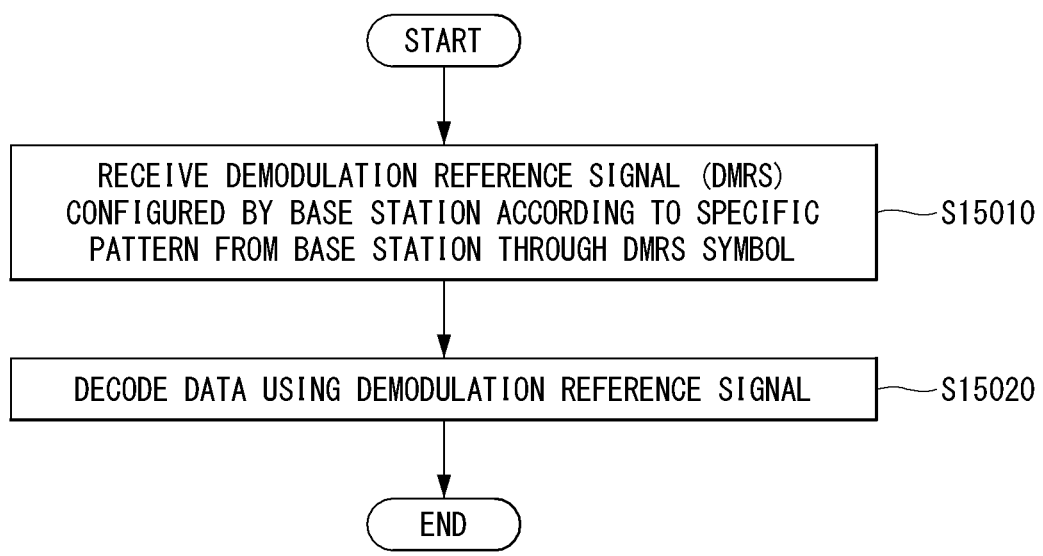
FIG. 15 is a flowchart illustrating an example of a method for decoding data by receiving a demodulation reference signal proposed herein.

FIG. 15 is a flowchart illustrating an example of a method for decoding data by receiving a demodulation reference signal proposed herein.

Referring to FIG. 15, UE receives a demodulation reference signal (DMRS) configured by a base station according to a specific pattern from a base station through a DMRS symbol (S15010).

The demodulation reference signal is transmitted on a specific antenna port and may be located on the same one or two time-axis symbols as at least one other demodulation reference signal transmitted on another antenna port.

In addition, as described with reference to FIGS. 7A to 13C, the demodulation reference signal may be multiplexed and mapped to one or two time-axis symbols through the CDM on the frequency axis and/or the time axis.

At this time, the CDM applied on the time axis is called a first CDM, and the CDM applied on the frequency axis is called a second CDM.

The specific pattern may be one of the patterns described with reference to FIGS. 7A to 13C, and may be determined according to characteristics of the frequency band in which the demodulation reference signal is transmitted.

Thereafter, the UE may decode data using the received demodulation reference signal (S15020).

Figure 16:
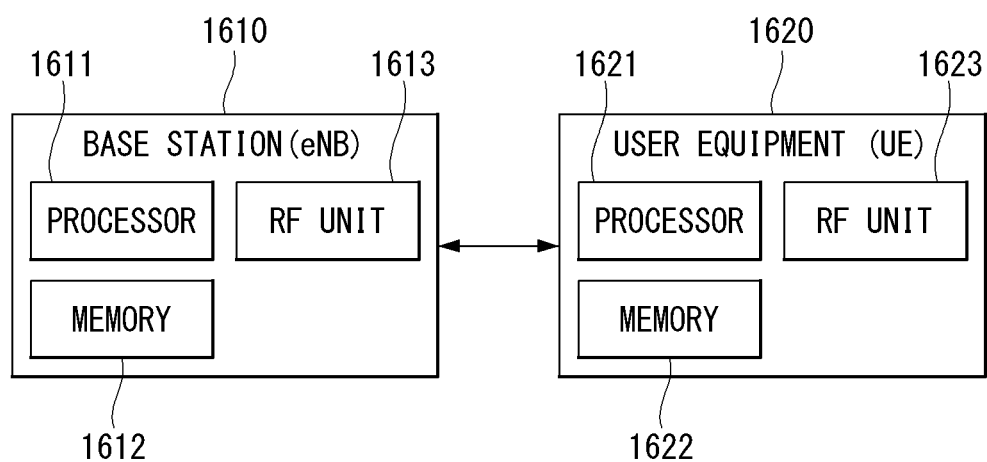
FIG. 16 is a diagram illustrating an example of an internal block diagram of a wireless device to which the present invention can be applied.

FIG. 16 is a diagram illustrating an example of an internal block diagram of a wireless device to which the present invention can be applied.

Here, the wireless device may be a base station and UE, and the base station includes both a macro base station and a small base station.

As illustrated in FIG. 16, a base station 1610 and UE 1620 include a communication unit (transmitter and receiver 1613 and RF unit 1623), processors 1611 and 1621, and memories 1612 and 1622.

In addition, the base station and the UE may further include an input unit and an output unit.

The communication units 1613 and 1623, the processors 1611 and 1621, the input unit, the output unit, and the memories 1612 and 1622 are functionally connected to perform the method proposed herein.

When the communication unit (transmitter and receiver 1613 and RF unit 1623) receives information generated from a physical layer protocol (PHY protocol), the received information is transferred to radio-frequency spectrum (RF spectrum), filtered, and amplified and the like and then transmitted to an antenna. In addition, the communication unit functions to transfer a radio frequency signal (RF signal) received from the antenna to a band that can be processed by the PHY protocol and perform filtering.

The communication unit may also include a switch function for switching the transmission and reception functions.

The processors 1611 and 1621 implements functions, processes, and/or methods proposed herein. The layers of the radio interface protocol may be implemented by the processor.

The processors may be implemented by a control part, a controller, a control unit, a computer, or the like.

The memories 1612 and 1622 are connected to the processor and store protocols or parameters for performing an uplink resource allocation method.

The processors 1611 and 1612 may include an application-specific integrated circuit (ASIC), other chipsets, a logical circuit, and/or a data processing apparatus. The memory 720 may include a read-only memory (ROM), a random access memory (RAM), a flash memory, a memory card, a storage medium, and/or other storage apparatuses. The communication unit may include a baseband circuit for processing a wireless signal. When the embodiment is implemented by software, the above-mentioned technique may be implemented by a module (a process, a function, or the like) that performs the above-mentioned function.

The module may be stored in the memory and be executed by the processor. The memory may be located inside or outside the processor and may be connected to the processor by a well-known unit.

The output unit (display unit or display unit) is controlled by a processor and outputs information output from the processor together with a key input signal generated from the key input unit and various information signals from the processor.

Further, for convenience of description, the drawings are divided and described, but it can be designed to implement a new embodiment by combining the embodiments described in each drawing. According to the needs of those skilled in the art, it is also within the scope of the present invention to design a computer-readable recording medium having recorded thereon a program for executing the embodiments described above.

The method for transmitting and receiving a reference signal according to the present specification is not limited to the configuration and method of the embodiments described as described above, but all or part of each embodiment may be selectively combined and configured so that the above embodiments can be variously modified.

On the other hand, the method for transmitting and receiving a reference signal of the present specification can be implemented as a processor-readable code on a processor-readable recording medium provided in the network device. The computer readable recording medium may include all kinds of recording apparatuses in which data that may be read by the processor are stored. An example of the processor-readable recording medium may include ROM, RAM, CD-ROM, a magnetic tape, a floppy disk, an optical data striate, or the like, and also include media implemented in a form of a carrier wave such as transmission through the Internet. In addition, the processor-readable recording medium may be distributed in computer systems connected to each other through a network, such that the processor-readable codes may be stored and executed in a distributed scheme.

Although the preferred exemplary embodiments of the present disclosure have been disclosed for illustrative purposes, those skilled in the art will appreciate that various modifications, additions and substitutions are possible, without departing from the scope and spirit of the disclosure as disclosed in the accompanying claims. Accordingly, such modifications, additions and substitutions should also be understood to fall within the scope of the present disclosure.

In this specification, both the object invention and the method invention are described, and the descriptions of both inventions can be supplementally applied as needed.

INDUSTRIAL APPLICABILITY

In the wireless communication system of the present invention, the RRC connection method has been described with reference to an example applied to the 3GPP LTE/LTE-A system, but the RRC connection method may be applied to various wireless communication systems in addition to the 3GPP LTE/LTE-A system

The invention claimed is:

1. A method performed by a first wireless device operating in a wireless communication system, the method comprising:
  mapping a demodulation reference signal (DMRS) to resource elements (REs) in one or two symbols, based on a specific pattern, and
  transmitting, to a second wireless device, the DMRS,
  wherein the DMRS is mapped to the REs based on a code division multiplexing (CDM) related to the specific pattern,
  wherein the CDM includes i) a first CDM on a frequency domain and ii) a second CDM on a time domain,
  wherein a sequence applied to the second CDM is one of two sequences related to the second CDM which include (+1 −1) and (+1 +1), and
  wherein, based on that a phase tracking reference signal (PTRS) is transmitted from the first wireless device to the second wireless device, the sequence applied to the second CDM is (+1 +1).

2. The method of claim 1, wherein the first wireless device is a base station (BS) and the second wireless device is a user equipment (UE).

3. The method of claim 1, wherein the first wireless device is a user equipment (UE) and the second wireless device is a base station (BS).

4. The method of claim 1, wherein the sequence applied to the second CDM is applied based on (i) the DMRS is mapped to two symbols, (ii) the two symbols are adjacent symbols and (iii) the PTRS is transmitted from the first wireless device to the second wireless device.

5. The method of claim 1, wherein the DMRS is transmitted based on (i) a specific antenna port and (ii) the one or two symbols on which at least one other DMRS based on another antenna port is transmitted.

6. The method of claim 1, wherein, based on that only one sequence related to the second CDM is applied, the DMRS and at least one other DMRS based on an antenna port different from that of the DMRS are mapped to the one or two symbols based on a frequency division multiplexing (FDM).

7. The method of claim 1, wherein the specific pattern is determined based on characteristics of a frequency band in which the DMRS is transmitted.

8. A first wireless device configured to operate in a wireless communication system, the first wireless device comprising:
  a radio frequency unit; and
  a processor configured to functionally couple to the radio frequency unit,
  wherein the processor is further configured to:
  map a demodulation reference signal (DMRS) to resource elements (REs) in one or two symbols, based on a specific pattern, and
  transmit, to a second wireless device, the DMRS,
  wherein the DMRS is mapped to the REs based on a code division multiplexing (CDM) related to the specific pattern,
  wherein the CDM includes i) a first CDM on a frequency domain and ii) a second CDM on a time domain,
  wherein a sequence applied to the second CDM is one of two sequences related to the second CDM which include (+1 −1) and (+1 +1), and
  wherein, based on that a phase tracking reference signal (PTRS) is transmitted from the first wireless device to the second wireless device, the sequence applied to the second CDM is (+1 +1).

9. The first wireless device of claim 8, wherein the first wireless device is a base station (BS) and the second wireless device is a user equipment (UE).

10. The first wireless device of claim 8, wherein the first wireless device is a user equipment (UE) and the second wireless device is a base station (BS).

11. The first wireless device of claim 8, wherein the sequence applied to the second CDM is applied based on (i) the DMRS is mapped to two symbols, (ii) the two symbols are adjacent symbols and (iii) the PTRS is transmitted from the first wireless device to the second wireless device.

12. The first wireless device of claim 8, wherein the DMRS is transmitted based on (i) a specific antenna port and (ii) the one or two symbols on which at least one other DMRS based on another antenna port is transmitted.

13. The first wireless device of claim 8, wherein, based on that only one sequence related to the second CDM is applied, the DMRS and at least one other DMRS based on an antenna port different from that of the DMRS are mapped to the REs based on a frequency division multiplexing (FDM).

14. The first wireless device of claim 8, wherein the specific pattern is determined based on characteristics of a frequency band in which the DMRS is transmitted.

15. At least one non-transitory computer-readable media storing instructions that, when executed by at least one processor, perform operations comprising:
   mapping a demodulation reference signal (DMRS) to resource elements (REs) in one or two symbols, based on a specific pattern, and
   transmitting, to a second wireless device, the DMRS,
   wherein the DMRS is mapped to the REs based on a code division multiplexing (CDM) related to the specific pattern,
   wherein the CDM includes i) a first CDM on a frequency domain and ii) a second CDM on a time domain,
   wherein a sequence applied to the second CDM is one of two sequences related to the second CDM which include (+1 −1) and (+1 +1), and
   wherein, based on that a phase tracking reference signal (PTRS) is transmitted from a first wireless device to the second wireless device, the sequence applied to the second CDM is (+1 +1).

16. The at least one non-transitory computer-readable media of claim 15, wherein the first wireless device is a base station (BS) and the second wireless device is a user equipment (UE).

17. The at least one non-transitory computer-readable media of claim 15, wherein the first wireless device is a user equipment (UE) and the second wireless device is a base station (BS).

18. The at least one non-transitory computer-readable media of claim 15, wherein the sequence applied to the second CDM is applied based on (i) the DMRS is mapped to two symbols, (ii) the two symbols are adjacent time symbols and (iii) the PTRS is transmitted from the first wireless device to the second wireless device.

19. The at least one non-transitory computer-readable media of claim 15, wherein the DMRS is transmitted based on (i) a specific antenna port and (ii) the one or two symbols on which at least one other DMRS based on another antenna port is transmitted.

20. The at least one non-transitory computer-readable media of claim 15, wherein, based on that only one sequence related to the second CDM is applied, the DMRS and at least one other DMRS based on an antenna port different from that of the DMRS are mapped to the REs based on a frequency division multiplexing (FDM).

* * * * *